(12) United States Patent
Muraki et al.

(10) Patent No.: US 7,053,326 B2
(45) Date of Patent: May 30, 2006

(54) INTEGRATED TYPE GAS-INSULATED SWITCHING APPARATUS

(75) Inventors: Sachio Muraki, Yokohama (JP); Hiroshi Murase, Kawasaki (JP); Reiji Ohara, Yokohama (JP); Akio Kobayashi, Yokohama (JP); Hirokazu Takagi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 10/798,293

(22) Filed: Mar. 12, 2004

(65) Prior Publication Data

US 2004/0169015 A1 Sep. 2, 2004

Related U.S. Application Data

(62) Division of application No. 09/986,007, filed on Nov. 7, 2001, now Pat. No. 6,743,999.

(30) Foreign Application Priority Data

Nov. 8, 2000 (JP) ........................................ 2000-341079

(51) Int. Cl.
*H01H 33/14* (2006.01)

(52) U.S. Cl. ................. 218/2; 218/7; 218/14; 218/153; 218/154

(58) Field of Classification Search ............. 218/2–7, 218/10, 12–14, 43, 69, 78, 84, 92, 120, 140, 218/153–155
See application file for complete search history.

(56) References Cited

U.S. PATENT DOCUMENTS

| 3,097,280 | A | | 7/1963 | Schimming et al. | |
|---|---|---|---|---|---|
| 4,004,118 | A | | 1/1977 | Boersma et al. | |
| 4,379,957 | A | | 4/1983 | Calvino | |
| 4,486,635 | A | * | 12/1984 | de Calvino y Teijeiro | .... 218/57 |
| 5,668,360 | A | * | 9/1997 | Perret et al. | .... 218/5 |
| 5,898,565 | A | * | 4/1999 | Yamauchi et al. | .... 361/612 |
| 6,444,937 | B1 | * | 9/2002 | Piazza | .... 218/68 |
| 6,545,241 | B1 | * | 4/2003 | Franchi et al. | .... 218/78 |
| 6,573,469 | B1 | * | 6/2003 | Piazza | .... 218/7 |

* cited by examiner

*Primary Examiner*—Lincoln Donovan
*Assistant Examiner*—M. Fishman
(74) *Attorney, Agent, or Firm*—Oblon, Spivak, McClelland, Maier & Neustadt, P.C.

(57) ABSTRACT

In an integrated type gas-insulated switching apparatus, a plurality of switching devices are provided. Each of switching devices includes a contact and an insulated container in which the contact is contained. The contact comprises electrodes adapted to be contacted with each other and separated therefrom. The insulated container is filled with an insulating gas. A conductive container is provided, to which the plurality of switching devices are connected, respectively. An insulated structure supports the conductive container.

21 Claims, 17 Drawing Sheets

INTEGRATED TYPE GAS-INSULATED SWITCHING APPARATUS

CROSS-REFERENCE TO RELATED DOCUMENTS

The present application is a divisional of U.S. application Ser. No. 09/986,007 filed on Nov. 7, 2001 now U.S. Pat. No. 6,743,999, and in turn claims priority to JP 2000-341079 filed Nov. 8, 2000, the entire contents of each of which are hereby incorporated herein y reference.

BACKGROUND OF THE INVENTION

1. Field of the Invention

The present invention relates to an integrated type gas-insulated switching apparatus for electrical power systems, which has a container made of an insulating material and is filled with an insulating gas. More particularly, the present invention relates to an integrated type gas-insulated switching apparatus that includes a plurality of switching devices.

2. Description of the Related Art

Conventionally, various integrated type gas-insulated switching apparatuses are well known, and a typical example thereof is described in U.S. Pat. No. 5,841,087, which is shown in FIG. 18.

With the integrated type gas-insulated switching apparatus shown in FIG. 18, an isolating switch 1 is housed in a grounded metal housing 2 filled with an insulating gas, such as $SF_6$. Stationary electrodes 3 and 4 forming switching points (contacts) are fixed to insulating spacers, and are fixed to the grounded metal housing 2 by flanges 5 and 6.

On the other hand, a stationary electrode 8 electrically connected to the grounded metal housing 2 is fixed to a flange 7. A drive shaft 10 is provided from the outside of the grounded metal housing 2 into it with the gastight of the insulating gas kept. A current terminal 11 is connected to a different device, which is not shown, to a circuit breaker, for example.

Cylindrical movable electrodes 12, 13, and 14 shown in FIG. 18 are companion to the stationary electrodes 3, 4, and 8, forming switching points (contacts) 15, 16, and 17, respectively. The movable electrodes 12, 13, and 14 are electrically conductively connected to the current terminal 11 via a metal container 18 and sliding contacts (not shown).

Busbars are connected to the stationary electrodes 3 and 4 so that the switching points 15 and 16 serve as bus selection disconnecting switches, respectively. The stationary electrode 8 is grounded, and the switching point 17 acts as a grounding switch.

A drive mechanism 19 is adapted to transmit rotational power caused from the drive shaft 10 to the movable electrodes 12, 13, and 14. The drive mechanism 19 has cams 20 and 21 connected to the movable electrodes 12 and 13 and a cam (not shown) connected to the movable electrode 15. These cams are linearly reciprocally displaced from the rotation of the drive shaft 10. The drive mechanism 19 also has levers attached to the shaft 10 so as to interact with these cams.

In the conventional integrated type gas-insulated switching apparatus described above, however, both of the switching points 15 and 16 acting as two disconnecting switches are disposed in the same metal housing 2, and the movable electrodes 12, 13, and 14 are provided directly to the common drive mechanism 19. Thus, in cases where one of the disconnecting switches (one of the switching points 15 and 16) malfunctions, it is impossible to replace the only malfunctioning switching point (i.e., disconnecting switch), because the remaining switching point (i.e., disconnecting switch) also loses its disconnecting function. It is therefore necessary to replace both switching points 15 and 16 (disconnecting switches) at the same time. This makes the replacement cost increase.

In addition, when replacing the disconnecting switches, it is necessary to disassemble the disconnecting switches on site and reassemble new disconnecting switches thereon, lengthening the time required for the replacement work.

When, on the other hand, replacing the entire apparatus including the disconnecting switches, because of transporting a large apparatus in which the disconnecting switches are assembled, the transporting work requires tremendous cost.

With the above conventional switching apparatus, the two switching points 15 and 16 acting as two disconnecting switches are provided in the same gas compartment. That is, there is no gas partition between the two switching points 15 and 16. In this state, the two switching points 15 and 16 are connected with double-busbars via no other switching points. In this configuration, in cases where, for example, one of the busbars is hit by lightning, the lightning reaches all the way into its disconnecting switch. This causes insulation breakdown in the disconnecting switch to be short-circuited to the earth, with the result that the remaining switching point connected to the remaining disconnecting switch also loses its disconnecting function. The reason is that such remaining switching point is also housed in the same gas compartment in which the short-circuiting to the earth occurred. Accordingly this makes it impossible to transmit power for all systems connected via no other switching points to the gas compartment of each of the disconnecting switches.

That is, both operations of the double-busbars stop so that it is difficult to fulfill the object of the double-busbar configuration allowing, when one of the double-busbars does not transmit power, the other thereof transmits power.

SUMMARY OF THE INVENTION

The present invention is directed to overcome the foregoing problems.

Accordingly, it is an object of the present invention to provide an integrated type gas-insulated switching apparatus that is capable of decreasing the cost required for replacing at least one contact (switching point) that malfunctions and reducing the time required for replacing it, thereby making low cost the integrated type gas-insulated switching apparatus.

Another object of the present invention to provide an integrated type gas-insulated switching apparatus that is capable of being applied to a power transmission system with double-bus bar configuration, and being used to select one of the double-busbars without damaging the essential role of the double-busbar configuration.

To achieve such objects, according to one aspect of the present invention, there is provided an integrated type gas-insulated switching apparatus comprising:

a plurality of switching devices each including a contact and an insulated container in which the contact is contained, the contact comprising electrodes adapted to be contacted with each other and separated therefrom, the insulated container filling with an insulating gas;

a conductive container to which the plurality of switching devices are connected, respectively; and an insulated structure supporting the conductive container.

According to one aspect of the present invention, the switching devices can be easily separated from or connected to the conductive container as a single unit, so that, when a single switching device causes malfunction, it is extremely easy to replace only the switching device causing malfunction.

To achieve such objects, according to one aspect of the present invention, there is provided an integrated type gas-insulated switching apparatus comprising:

a plurality of switching devices each including a contact and an insulated container in which the contact is contained, the contact comprising electrodes adapted to be contacted with each other and separated therefrom, the insulated container filling with an insulating gas;

a conductive container filling with an insulating gas, to which the plurality of switching devices are connected, respectively;

an insulated structure supporting the conductive container;

a partition wall provided between at least one of the switching devices and the conductive container so as to form a first gas compartment in the at least one of the switching devices and a second gas compartment in the conductive container; and means disposed to the partition wall and adapted to cause the insulating gas to flow in a forward direction from one of the first and second gas compartments toward other thereof and not to flow in opposite direction to the forward direction.

To achieve such objects, according to further aspect of the present invention, there is provided an integrated type gas-insulated switching apparatus comprising: a plurality of switching devices each including a contact and an insulated container in which the contact is contained, the contact comprising electrodes adapted to be contacted with each other and separated therefrom, the insulated container filling with an insulating gas;

a conductive container to which the plurality of switching devices are connected, respectively;

an insulated structure supporting the conductive container; and means for forming in the insulated containers of the switching devices separated gas compartments, respectively;

at least one of the insulated containers forming a common gas compartment of the conductive container and the insulated structure.

BRIEF DESCRIPTION OF THE DRAWINGS

Other aspects of the present invention will become apparent from the following description of embodiments with reference to the accompanying drawings in which.

DETAILED DESCRIPTION OF THE EMBODIMENTS

Embodiments of the present invention will now be described through reference to FIGS. 1 to 17.

Figure 1:
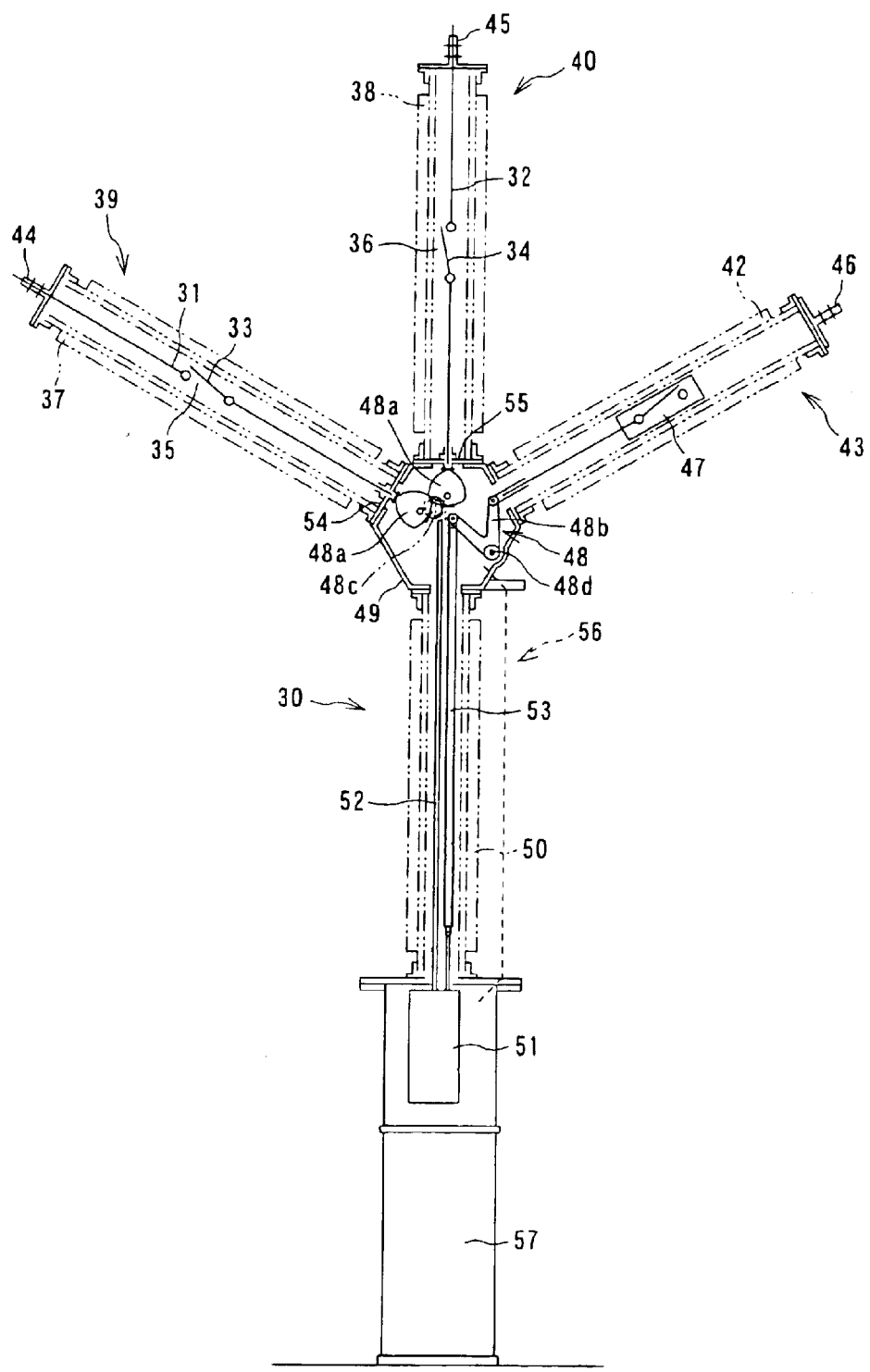
FIG. 1 is a cross sectional view illustrating an integrated type gas-insulated switching apparatus according to a first embodiment of the present invention.

First Embodiment (FIG. 1)

FIG. 1 is a cross sectional view illustrating a substantially entire integrated type gas-insulated switching apparatus according to a first embodiment of the present invention.

As shown in FIG. 1, an integrated type gas-insulated switching apparatus 30 of the first embodiment is provided with disconnecting contacts (switching points) 35 and 36 that comprise stationary electrodes 31 and 32 and movable electrodes 33 and 34, respectively.

The movable electrodes 33 and 34 can be contacted with the stationary electrodes 31 and 32 and separated therefrom.

The integrated type gas-insulated switching apparatus (hereinafter, referred to simply as switching apparatus) 30 is also provided with insulated containers 37 and 38 in which the disconnecting contacts 35 and 36 are housed, whereby the insulated containers 37 and 38 housing the disconnecting contacts 35 and 36 constitute two disconnecting switches 39 and 40, respectively. Each of the insulated containers 37 and 38 is filled with an insulating gas, such as $SF_6$ or the like.

The switching apparatus 30 is provided with a circuit breaker contact (switching point) 47 and a single insulated container 42 in which the breaker contact 47 is contained, so that the single insulated container 42 containing the breaker contact 47 constitutes a single circuit breaker 43. The insulated container 42 is filled with an insulating gas, such as $SF_6$ or the like.

Each of the insulated containers 37, 38 and 42 is made of an insulating member, such as a porcelain insulating tube, a composite insulating tube or the like.

The switching apparatus 30 is provided with external terminals 44, 45 and 46. Each of the disconnecting switches 39, 40 and the circuit breaker 43 is connected at each one end with an exterior of the switching apparatus 30 by each of the external terminals 44, 45 and 46.

The switching apparatus 30 is provided with a conductive container made of metal (metal container) 49 having, for example, a substantially hexagonal shape in its longitudinal cross section. The metal container 49 has six side surfaces. The disconnecting switches 39, 40 and the circuit breaker 43 are disconnectably connected at their other ends with upper side surfaces of the metal container 49, respectively, so that the insulated containers 37, 38 and 42 are removably attached to the upper side surfaces of the metal container 49, respectively.

Incidentally, the metal container may have various shapes. For example, in cases where the metal container has a substantially circular shape in its longitudinal cross section, the circular shaped metal container is formed at its periphery with a plurality of flange surfaces that are adjacent to each other. In this configuration, other ends of the disconnecting switches and the circuit breaker are disconnectably connected with upper adjacent three flange surfaces of the metal container.

On the other hand, the switching apparatus 30 comprises a drive mechanism 48 housed in the metal container 49 and linked to the contacts 35, 36 and 47 so that the drive mechanism 48 drives in conjunction with the contacts 35, 36 and 37.

The drive mechanism 48 comprises a pair of drive direction converting members 48a configured, for example, to cam constructions so that the drive direction converting members 48a rotate about their shafts 48c. The drive direction converting members 48a are operatively connected to the disconnecting contacts 35 and 36. The disconnecting contacts 35 and 36 are switched on or off according to the driving forces caused by the rotations of the drive direction converting members 48a, respectively.

The drive mechanism 48 also comprises a drive direction converting member 48b designed, for example, to have a substantially V-shaped lever and permitted to rotate about its shaft 48d.

The drive direction converting member 48b is operatively connected to the breaker contact 47 so that the breaker contact 47 is switched on or off according to the driving forces caused by the rotation of the drive direction converting member 48b.

In addition, the metal container 49 serves as a current path.

The switching apparatus 30 also comprises a base portion 57 mounted on the ground so that it is grounded, and an insulated structure (insulated container) 50 whose one end is mounted on the base portion 57 and vertically arranged thereto so that the insulated container 50 is grounded. A bottom side surface of the metal container 49 is supported on the insulated container 50.

The switching apparatus 30 also comprises a control unit 51 provided at the one end side of the insulated container 50 and housed in the base portion 57.

The switching apparatus 30 has two insulated control rods 52 and 53 arranged in the insulated container 50 in parallel with each other and penetrated therethrough.

Upper end portions of the control rods 52 and 53 are penetrated through the bottom surface of the metal container 49 thereinto. Via the upper end portions of the control rods 52 and 53, the drive direction converting members 48a and 48b are coupled to the control unit 51, whereby the control unit 51 can provide control force via the control rods 52 to the drive direction converting units 48a. The control unit 51 also can provide control force via the control rod 53 to the drive direction converting member 48b.

The circuit breaker 43 is connected to the metal container 49, thus being arranged to the outside of the disconnecting switches 39 and 40. Inner gas space of the insulated container 42 of the circuit breaker 43 is communicated to that of the metal container 49 so that the insulated container 42 and the metal container 49 belong to the common gas compartment, whereby the gas compartment is filled with the common insulating gas.

On the other hand, inner gas spaces of the insulated containers 37 and 38 of the two disconnecting switches 39 and 40 are shielded from that of the metal container 49 by partition walls 54, 55. The insulating gas with which the metal container 49 is filled is not circulated in the insulated containers 37, 38, so that each insulating gas with which each of the insulated containers 37 and 38 is filled is not circulated in the metal container 49 and the insulated container 42.

Furthermore, the switching device 30 comprises a grounding device 56 for connecting the metal container 49 to the grounded base portion 57, thus grounding the metal container 49, which is indicated by the broken lines in FIG. 1.

The overall operation of the switching apparatus 30 will now be described hereinafter.

The integrated type gas-insulated switching apparatus 30 in this first embodiment is insulated from the ground side by the insulated container 50. Under normal operating state of the apparatus 30, current transmitted through the external terminals 44, 45 flows through the disconnecting contacts 35, 36, the metal container 49 and the breaker contact 47 into the external terminal 46, whereby the external terminals 44, 45 and 46 are electrically connected to the outside by the external terminal 46. In general, the external terminal 44 of one disconnecting switch 39 is connected to one of the double-busbars. The external terminal 45 of the other disconnecting switch 40 is connected to the other thereof. The external terminal 46 of the circuit breaker 42 is electrically connected to a bank circuit of a transformer or the like, or to a line circuit of a power transmission line or the like.

According to the configuration of the switching apparatus 30, the control of the opening and closing conditions of each of the disconnecting switches 39, 40 permits the selection of one of the double-busbars which is connected to the bank circuit or the line circuit.

In this case, in order to operate the disconnecting contacts so as to shut off or break the external terminals 44, 45 and 46, the operating unit 51 operates, individually, the control rods 52 and 53 so as to move them vertically, thus providing operating forces to the drive direction converting members 48a and 48b, respectively.

The driving forces to the drive direction converting members 48a cause them to rotate in a predetermined direction, thus providing the driving forces to the disconnecting contacts 35 and 36, thereby making open the contacts 35 and 36.

On the other hand, the driving forces to the drive direction converting member 48b causes it to rotate in a predetermined direction, thus providing the driving force to the breaker contact 47, thereby making open the contact 47.

The opened contacts 35, 36 and 47 make the external terminals 44, 45 shut off from the external terminal 46.

After opening the contacts 35, 36 and 47, each of the contacts 35, 36, 47 and each of the insulated containers 37, 38, 42 cause the external terminals 44, 45, 46 and the metal container 49 to be insulated. In addition, the grounding device 56 provided for the metal container 49 permits it to be grounded.

Similarly, when the operating unit 51 operates, individually, the control rods 52 and 53 so as to cause the driving direction converting members 48a and 48b to rotate in other directions, the driving forces provided to the disconnecting contacts 35, 36 and breaker contact 47 make them close. As a result, the external terminals 44, 45 are electrically connected to the external terminal 46, thus returning the switching apparatus 30 to the normal operating state.

In addition, when the operating unit 51 operates to make close one selected contact in the disconnecting contacts 39 and 40, open other thereof, and make close the breaker contact 47, it is possible to cause current to flow from one of the double-busbars corresponding to the selected disconnecting contact through the breaker contact 47 into the external terminal 46.

When checking the switching apparatus 30 or other similar operations, it is possible for the grounding device 56 provided for the metal container 49 to ground it so that the whole of the switching apparatus 30 is grounded.

In the configuration of the switching apparatus 30, the disconnecting switches 39, 40 and the circuit breaker 43 are individually integrally housed in the different insulated containers 37, 38 and 42, respectively. The insulated containers 37, 38 and 42, therefore, are removably attached to the metal container 49 so that the disconnecting switches 39, 40 and the circuit breaker 43 are disconnectably connected thereto.

Then, the disconnection of the movable electrodes 33, 34 (the disconnecting switches 39, 40) from the driving mechanism 48 housed in the metal container 49 and the separation of the insulated containers 37, 38 therefrom make easily remove the disconnecting switches 39 and 40 from the metal container 49 with the gas-tight state therein kept.

Similarly, the connection of the movable electrodes 33, 34 with the driving mechanism 48 housed in the metal container 49 and the attachment of the insulated containers 37, 38 thereto make easily attach the switches 39, 40 to the metal container 49.

On the other hand, it is possible to remove or attach the circuit breaker 43 by performing the similar disconnection and connection operations in the case of the disconnecting switches 39, 40.

As described above, according to the switching apparatus 30 of the first embodiment, because the switching devices, that is, disconnecting switches 39, 40 and the circuit breaker 43, are integrated with the insulated containers 37, 38 and 42, respectively, it is possible to remove individually the disconnecting switches 39, 40 and the circuit breaker 43 as separated integral structures from the metal container 49, and attach individually new switches and breaker as separated integral structures thereto.

It is, therefore, when at least one of the switching devices 39, 40 and 47 breaks down, to easily replace the only broken switching device, making it possible to reduce the time required for replacing the broken switching device, while reducing the working cost required for replacing it.

Because the insulated container 50 supporting the metal container 49 performs the insulation of the high-voltage electrodes, such as movable electrodes 33, and 34, from the ground, there is no need to worry about insulating the switching devices 39, 40 and 43 from the ground, making it possible to provide the switching apparatus 30 having low-cost.

The control rods 52, 53 for controlling each of the switching devices 39, 40 and 43 are installed in the insulated container 50 filling with the insulating gas, so that it is possible for the control rods 52, 53 with short lengths to drive the movable electrodes 33, 34 provided on the high potential side.

The above structure of the switching apparatus 30 is the basic structure of a line circuit, bank circuit, or the like connected to double-busbars, so that the reduction of the switching apparatus in size by the gas insulation makes extremely reduced the whole size of a substation in which the switching apparatus 30 is installed.

In this structure, the same types of switching devices, such as, for example, the disconnecting switches, are connected to the double-busbars, respectively.

Even if, however, lightning strikes one of the double-busbars and reaches all the way into one of the switching devices, causing the insulation breakdown in the one of the switching devices and short circuiting therein, other of the switching devices continues operating properly, because the same types of switching devices are contained in the separated gas compartments, such as, for example, the separated insulated containers 37 and 38, respectively.

That is, it is possible to prevent both of the double-busbars from stopping operations.

Consequently, the first embodiment can provide an integrated type gas-insulated switching apparatus capable of being applied to selecting busbars without eliminating the essential part of a double-busbar construction, while allowing power to be transmitted by one of the double-busbars even if the other of the double-busbars becomes incapable of transmitting power.

In addition, even if the insulation of the circuit breaker breaks down and a short-circuit occurs, the disconnecting switches keen their capability to open their own contacts, so that it is possible to replace only the broken switching device. As a result, it is possible to cut off the busbar from the line side and to make economic the cost required for transmitting the replacement device to the site on which the switching apparatus is established, and to reduce the time required for completing the replacement of the replacement device.

Furthermore, because the same types of switching devices, such as, the disconnecting switches 39, 40 are arranged adjacently to each other, it is possible to drive the movable electrodes 33 and 34 of the switching devices 39, 40 by means of the common control rod 52. The single control rod 52, therefore, can control the two switching devices 39 and 40, making it possible to provide an integrated type gas-insulated switching apparatus that is less expensive and more compact.

Figure 2:
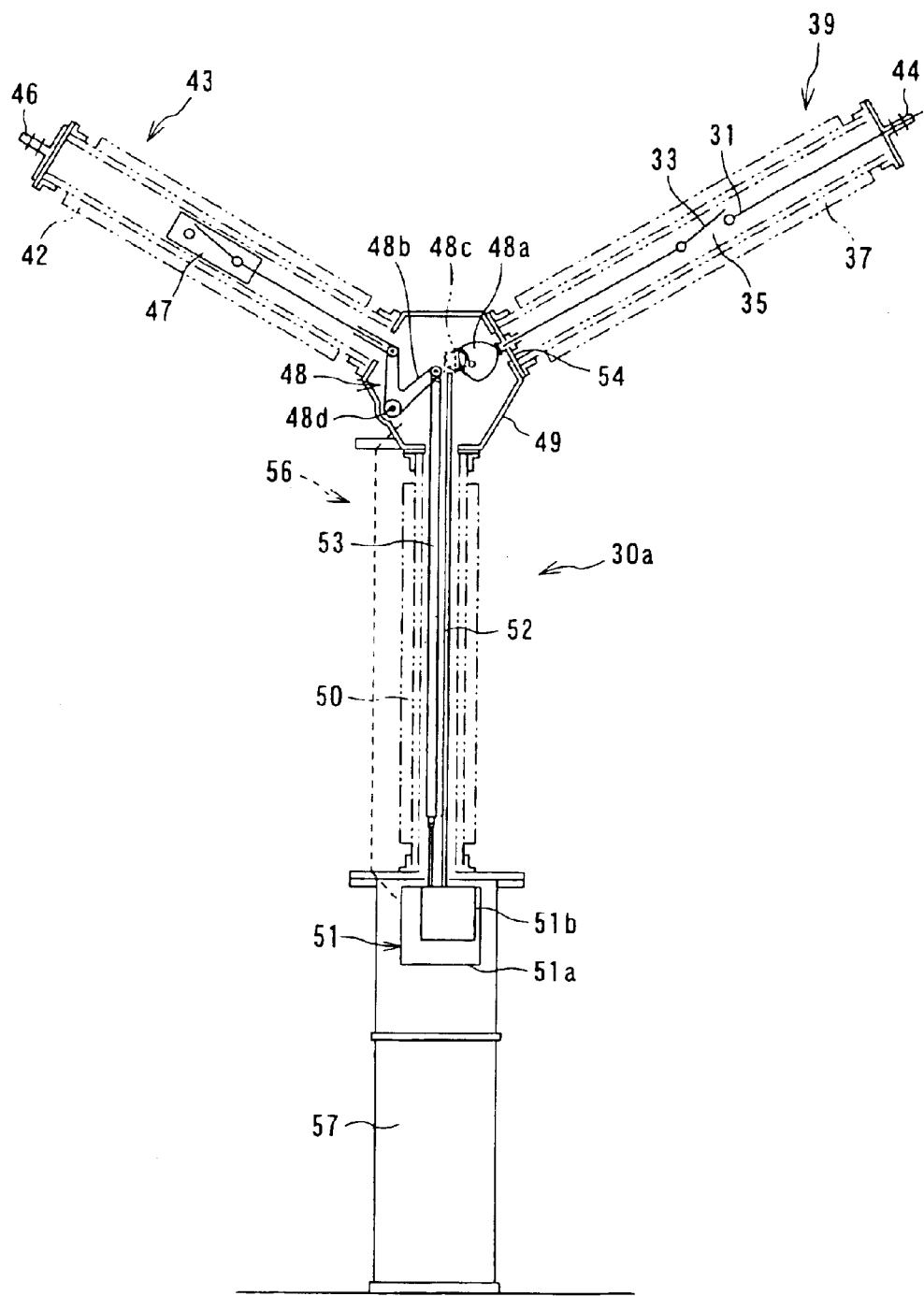
FIG. 2 is a cross sectional view illustrating an integrated type gas-insulated switching apparatus according to a second embodiment of the present invention.

Second Embodiment (FIG. 2)

FIG. 2 is a cross sectional view illustrating a substantially entire integrated type gas-insulated switching apparatus 30a according to a second embodiment of the present invention.

Incidentally, elements of the switching apparatus 30a in FIG. 2 that are substantially the same as those of the switching apparatus 30 are given the same or similar reference numerals in FIG. 1, so that descriptions of the elements are simplified or omitted.

As shown in FIG. 2, the integrated type gas-insulated switching apparatus 30a of the second embodiment comprises the disconnecting switch 39 and the circuit breaker 43 which are connected to the metal container 49 in a diagonal layout so as to have a substantially V-shape.

That is, each of the disconnecting switch 39 and the circuit breaker 43 is connected at each one end with an exterior of the switching apparatus 30a by each of the external terminals 44 and 46.

The disconnecting switches 39 and the circuit breaker 43 are disconnectably connected at their other ends with upper opposite two side surfaces of the metal container 49, respectively, so that the insulated containers 37 and 42 are removably attached to the upper side surfaces of the metal container 49, respectively.

The drive mechanism 48 including the direction converting member 48a and the direction converting member 48b is housed in the metal container 49, which is served as a current path, and linked to the contacts 35 and 47 housed in the insulated containers 37 and 42. The drive mechanism 48 (converting members 48a and 48b) drives in conjunction with the contacts 35 and 47.

The bottom side surface of the metal container 49 is supported on the insulated container 50. The control unit 51 is provided at the one end side of the insulated container 50 and housed in the base portion 57. The two insulated control rods 52 and 53 are arranged in parallel in the insulated container 50 so as to be penetrated therethrough.

In this embodiment, the control unit 51 comprises a first control unit 51a coupled via the control rod 52 to the converting member 48a and a second control unit 51b coupled via the control rod 53 to the converting member 48b. That is, the first control unit 51a can provide control force via the control rod 52 to the drive direction converting unit 48a and the second control unit 51b can provide control force via the control rod 53 to the drive direction converting member 48b.

The circuit breaker 43 connected to the metal container 49, the metal container 49 and the insulated container 50 constitute the same gas compartment that is filled with the insulating gas. The inner gas space of the insulated container 37 (disconnecting switch 39) is shielded from that of the metal container 49 by the partition wall 54 so that the insulating gas with which the metal container 49 is filled is not circulated to in the insulated container 37.

The grounding device 56 is provided for connecting the metal container 49 to the grounded base portion 57, thus grounding the metal container 49.

The overall operation of the switching apparatus 30a will now be described hereinafter.

The integrated type gas-insulated switching apparatus 30a in this second embodiment is insulated from the ground side by the insulated container 50. Under normal operating state of the apparatus 30a, current transmitted through the external terminal 46 flows through the breaker contact 47, the metal container 40 and the disconnecting contact 35 into the external terminal 44, whereby the external terminal 46 is electrically connected to the outside by the external terminal 44.

In order to operate the contacts so as to shut off or break the external terminals 44 and 46, the first and second operating units 51a and 51b operate the control rods 52 and 53, respectively, so as to drive the direction converting members 48a and 48b, thereby making open the disconnecting contact 35 and the breaker contact 47.

After opening the contacts 35 and 47, each of the contacts 35, 47 and each of the insulated containers 37, 42 cause the external terminals 44, 46 and the metal container 49 to be insulated. In addition, the grounding device 56 provided for the metal container 49 permits the metal container 49 to be grounded.

Similarly, the closing operation of the control unit 51 returns the switching apparatus 30a to the normal operating state.

The above structure of the switching apparatus 30a of the second embodiment is the basic structure including the circuit breaker, so that the reduction of the switching apparatus in size by the gas insulation makes extremely reduced the whole size of a transformer substation in which the switching apparatus 30a is installed. These integrated type gas-insulated switching apparatuses also can be combined so that the combined integrated type gas-insulated switching apparatuses can be applied for portions including circuit breakers of almost any transformer substation. As a result, it is sufficient to prepare a series of the integrated type gas-insulated switching apparatuses 30a each having a few types of switching devices, so as to cover various transformer substations, making it possible to reduce the cost of each switching apparatus.

In addition, the switching devices (the disconnecting switch and the circuit breaker) are separated so that the insulating gas is not circulated between each other.

Even if, therefore, the insulation of one of the switching devices breaks down and a short-circuit occur, the other switching device continues operating properly, it is possible to replace the only broken switching device, whereby to make economic the cost required for transmitting the replacement device to the site on which the switching apparatus is established, and to reduce the time required for completing the replacement of the replacement device.

Figure 3:
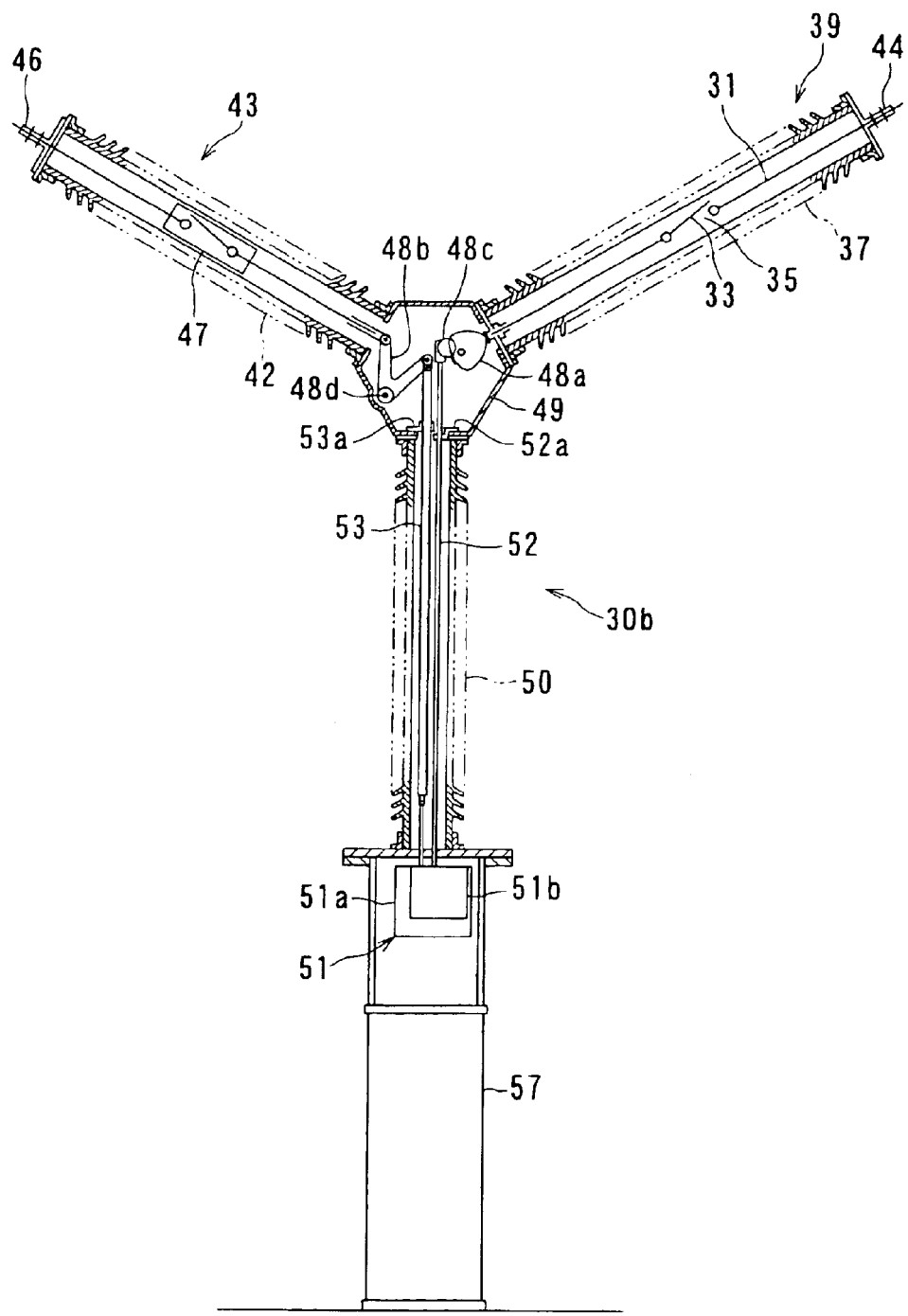
FIG. 3 is a cross sectional view illustrating an integrated type gas-insulated switching apparatus according to a third embodiment of the present invention.

Third Embodiment (FIG. 3)

FIG. 3 is a cross sectional view illustrating a substantially entire integrated type gas-insulated switching apparatus 30b according to a third embodiment of the present invention.

Incidentally, elements of the switching apparatus 30b in FIG. 3 that are substantially the same as those of the switching apparatus 30a are given the same or similar reference numerals in FIG. 2, so that descriptions of the elements are simplified or omitted.

As shown in FIG. 3, the integrated type gas-insulated switching system 30b of the second embodiment comprises control rod guide members 52a and 53a provided to the upper side of the insulated container 50. In this embodiment, the control rod guide members 52a and 53a are mounted on the bottom surface of the metal container 49.

The control rod guide members 52a and 53a are adapted to individually guide the upper end portion of the control rods 52 and 53, respectively. That is, each of the control rod guide members 52a and 53a is configured to form substantially ring-blacket so that each of the upper end portions of the control rods 52 and 53 is inserted and communicated in each of the ring portions of the control rod guide members 52a and 53a, thus being guided thereby.

According to the structure of the switching apparatus 30b shown in FIG. 3, the control rod guide members 52 and 53 individually guide the control rods 52 and 53 in the metal container 49, causing the interference of the control rods 52 and 53 to be prevented. It is possible, therefore, to prevent shifts of the control rods 52 and 53 which are vertically moved, shifts which are deviated from the moving direction. It is also possible to distribute control forces acting on the control rods 52 and 53 when the disconnecting contact 35 and the breaker contact 47 are operated.

In addition to the effects obtained by the first and second embodiments, it is possible to improve the certainty of the movements of the control rods 52 and 53, respectively.

Incidentally, in this embodiment, both of the control rod guide members 52a and 53a are provided, but one of the control rod guides 52a and 53a may be provided. In addition, control rod guide members 52a and 53a are mounted on the bottom surface of the metal container 49, but the control rod guide members 52a and 53a may be provided to the lower side of the insulated container 50, or may be provided to upper and lower sides of the insulated container 50.

Figure 4:
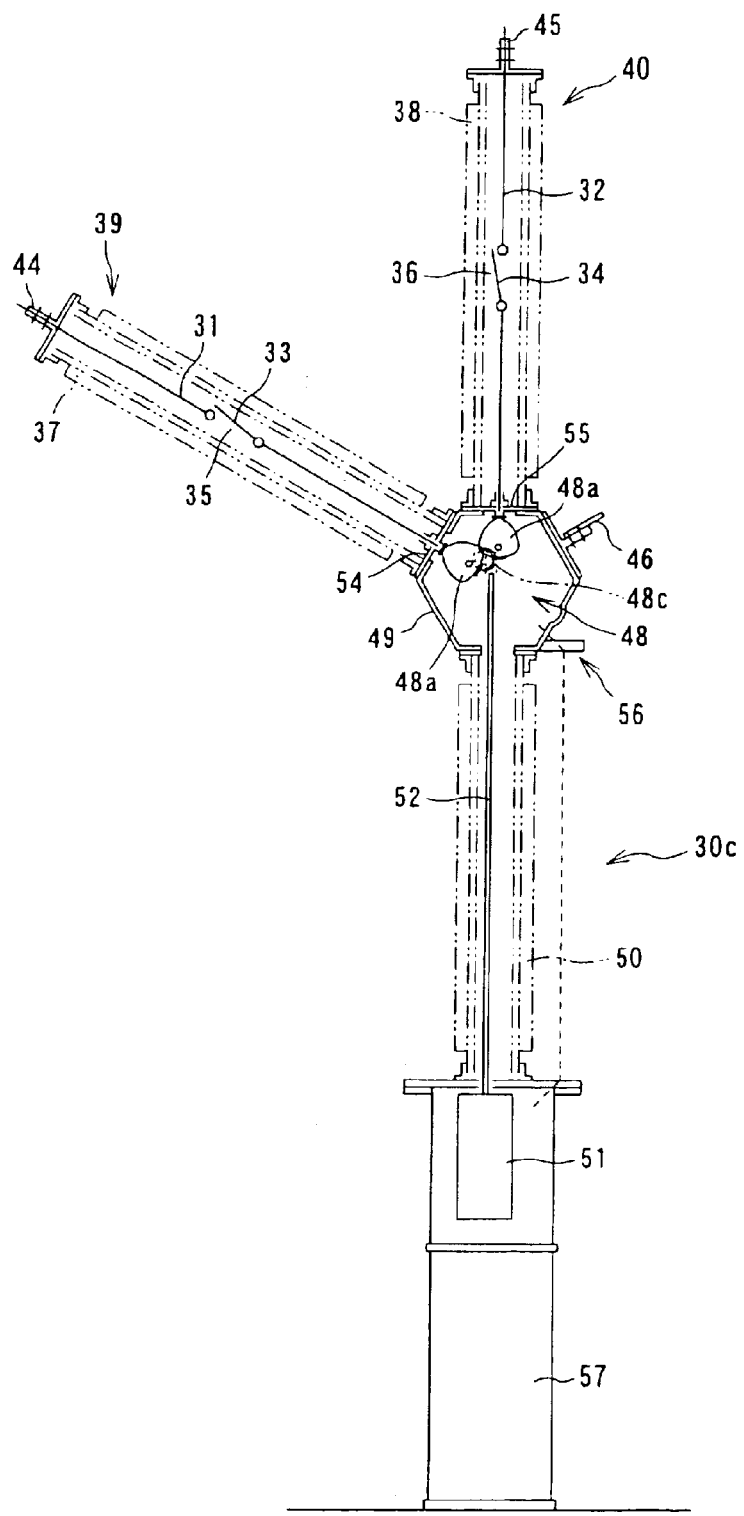
FIG. 4 is a cross sectional view illustrating an integrated type gas-insulated switching apparatus according to a fourth embodiment of the present invention.

Fourth Embodiment (FIG. 4)

FIG. 4 is a cross sectional view illustrating a substantially entire integrated type gas-insulated switching apparatus 30c according to a fourth embodiment of the present invention.

Incidentally, elements of the switching apparatus 30c in FIG. 4 that are substantially the same as those of the switching apparatus 30 are given the same or similar reference numerals in FIG. 1, so that descriptions of the. elements are simplified or omitted.

As shown in FIG. 4, the integrated type gas-insulated switching system 30c of the fourth embodiment comprises the disconnecting switches 39 and 40 including the insulated containers 37 and 38 in which the disconnecting contacts 35 and 36 are housed. Each of the disconnecting switches 39 and 40 is connected at each one end with an exterior of the switching apparatus 30c by each of the external terminals 44 and 45.

The disconnecting switches 39 and 40 are disconnectably connected at their other ends with upper adjacent two side surfaces of the metal container 49, respectively. The insulated containers 37 and 38 are removably attached to the upper side surfaces of the metal container 49, respectively.

In addition, one external terminal 46 is connected to another upper side surface of the metal container 49.

The drive mechanism 48 including the direction converting members 48a is housed in the metal container 49, which serves as a current path, and linked to the contacts 35 and 36 housed in the insulated containers 37 and 38. The drive mechanism 48 (converting members 48a) drives in conjunction with the contacts 35 and 36.

The bottom side surface of the metal container 49 is supported on the insulated container 50. The control unit 51 is provided at the one end side of the insulated container 50 and housed in the base portion 57. The insulated control rod 52 is arranged in the insulated container 50 so as to be penetrated therethrough.

The control unit 51 is coupled via the control rod 52 to the converting members 48a so that the control unit 51 can provide control force via the control rod 52 to the drive direction converting units 48a.

The metal container 49 and the insulated container 50 constitute the same gas compartment that is filled with the insulating gas.

The inner gas spaces of the insulated containers 37 and 38 (disconnecting switches 39 and 40) are shielded from that of the metal container 49 by the partition walls 54 and 55 so that the insulating gas with which the metal container 49 is filled is not circulated to in the insulated containers 37 and 38.

The grounding device 56 is provided for connecting the metal container 49 to the grounded base portion 57, thus grounding the metal container 49.

The overall operation of the switching apparatus 30c will now be described hereinafter.

The integrated type gas-insulated switching apparatus 30c in this fourth embodiment is insulated from the ground side by the insulated container 50. Under normal operating state of the apparatus 30c, current transmitted through the external terminal 44 or terminal 45, flows through the metal container 40 into and the disconnecting contact 35 or contact 36. The current further flows into the external terminal 46, whereby the external terminal 44 or terminal 45 is electrically connected to the outside by the external terminal 46.

In order to operate the contacts so as to shut off or break the external terminals 44 and 45, the operating unit 51 operates the control rod 52 so as to drive the direction converting members 48a, thereby making open the disconnecting contacts 35 and 36.

After opening the contacts 35 and 36, each of the contacts 35, 36 and each of the insulated containers 37, 38 cause the external terminals 44, 45 and the metal container 49 to be insulated. In addition, the grounding device 56 provided for the metal container 49 permits the metal container 49 to be grounded.

Similarly, the closing operation of the control unit 51 returns the switching apparatus 30c to the normal operating state.

The above structure of the switching apparatus 30c of the fourth embodiment is the basic structure including the disconnecting switches connected to the double-busbars, so that the switching apparatus 30c must be provided in all of the transformer stations each connecting the double-busbars. Moreover, the switching apparatus 30c may be applied to transformer stations without connecting the double-busbars, so that the switching apparatus 30c has an extremely wide range of potential applications.

Accordingly, because of adding the switching apparatus 30c to a series of the integrated type gas-insulated switching apparatuses, it is possible to cover various transformer substations by using the series of the integrated type gas-insulated switching apparatuses each having a few types of switching devices, making it possible to reduce the cost of each switching apparatus. It can also be easily replace at least one of the switching devices causing malfunction, making it possible to reduce the time required for replacing the at least one of the switching devices causing malfunction.

In addition, the switching devices (the disconnecting switches) are separated so that the insulating gas is not circulated between each other. Even if, therefore, the insulation of one of the switching devices breaks down and a short-circuit occur, the other switching device continues operating properly, it is possible to replace the only broken switching device, whereby to make economic the cost required for transmitting the replacement device to the site on which the switching apparatus is established, and to reduce the time required for completing the replacement of the replacement device.

Figure 5:
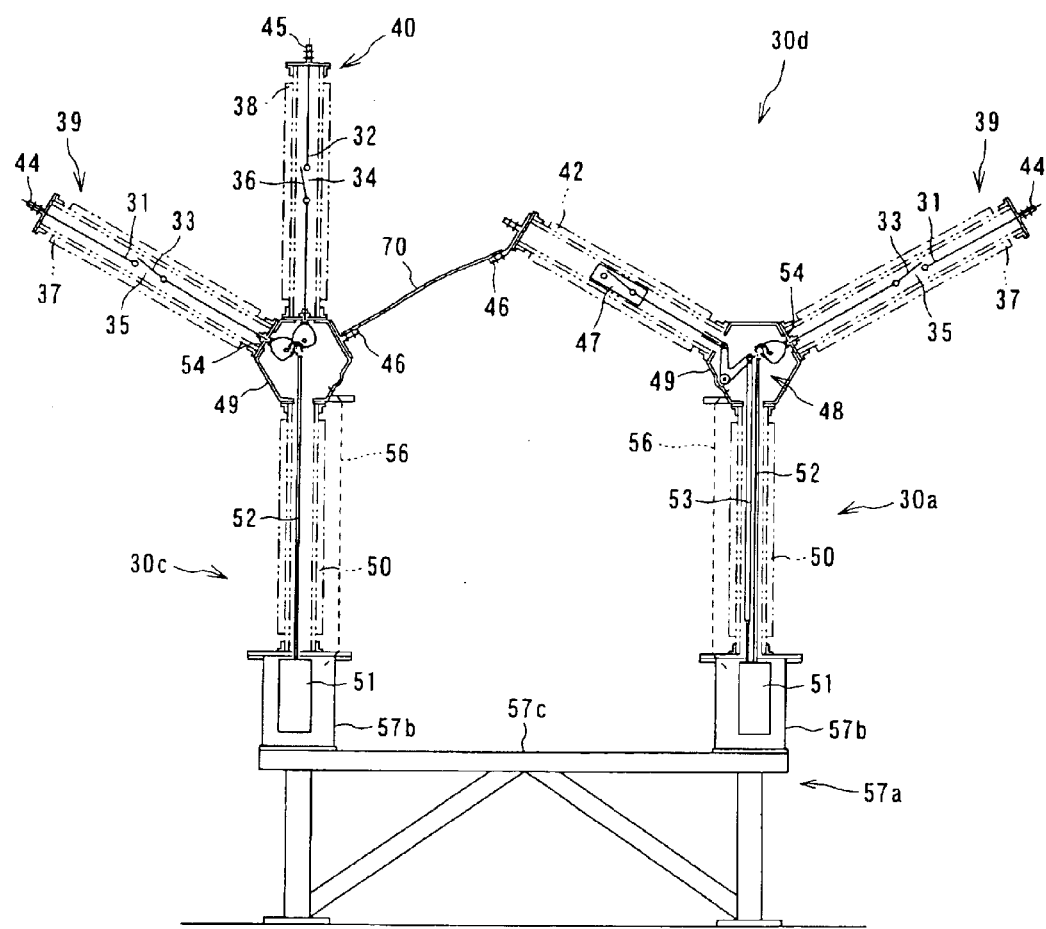
FIG. 5 is a cross sectional view illustrating an integrated type gas-insulated switching apparatus according to a fifth embodiment of the present invention.

Fifth Embodiment (FIG. 5)

FIG. 5 is a cross sectional view illustrating a substantially entire integrated type gas-insulated switching apparatus 30d according to a fifth embodiment of the present invention.

Incidentally, elements of the switching apparatus 30d in FIG. 5 which are substantially the same as those of the switching apparatuses 30a and 30c are given the same or similar reference numerals in FIGS. 2 and 4, so that descriptions of the elements are simplified or omitted.

As shown in FIG. 5, with the integrated type gas-insulated switching system 30d of the fifth embodiment, the integrated type gas-insulated switching systems 30a and 30c of the second and fourth embodiments are mounted on a base unit 57a. The base unit 57a comprises base portions 57b in which the control units 51, 51 are housed, and a common base stand 57c mounted on the ground so as to be grounded, and on which the base portions 57b are mounted. The insulated containers 50, 50 are mounted on the base portions 57.

A connecting conductor 70 connects the external terminal 46 of the switching apparatus 30c with the switching apparatus 30a.

According to the integrated type gas-insulated switching apparatus 30d in this embodiment, in addition to the operations of the integrated type gas-insulated switching apparatuses 30a and 30c of the second and fourth embodiments, the external terminal 46 of the integrated type gas-insulated switching apparatus 30c mounted on the common base stand 57cis connected by the connecting conductor 70 to the external terminal 46 of the integrated type gas-insulated switching apparatus 30a. The integrated type gas-insulated switching apparatuses 30a and 30c, therefore, are electrically connected with each other.

In general, the external terminal 44 is connected to one of the double-busbars, the external terminal 45 is connected to the other thereof, and the external terminal 46 is connected to a line circuit of a power transmission line, a bank circuit of a transformer or the like.

With the present embodiment, the control of the opening and closing conditions of each of the disconnecting switches 39, 40 permits the selection of one of the double-busbars which is connected to the bank circuit or the line circuit connected to the external terminal 46.

The structure in this embodiment is also the basis for bank circuit, a line circuit or the like connected to double-busbars, so that the reduction of the switching apparatus 30d in size by the gas insulation makes extremely reduced the whole size of a transformer substation in which the switching apparatus 30d is installed.

This structure of the switching apparatus 30d is not limited to the purpose of connecting to double-busbars, and because two different kinds of integrated type gas-insulated switching apparatuses which are capable of being used in various other transformer substation structures can be combined into a single switching unit 30d, it is possible to apply each of the switching units individually to various layouts of other devices.

As a result, it is possible to cover various transformer substations with various layouts of devices by using the series of the integrated type gas-insulated switching apparatuses each having a few types of switching devices, making it possible to reduce the cost of each switching apparatus. It can also be easily replace at least one of the switching units causing malfunction, making it possible to reduce the time required for replacing the at least one of the switching units.

Figure 6:
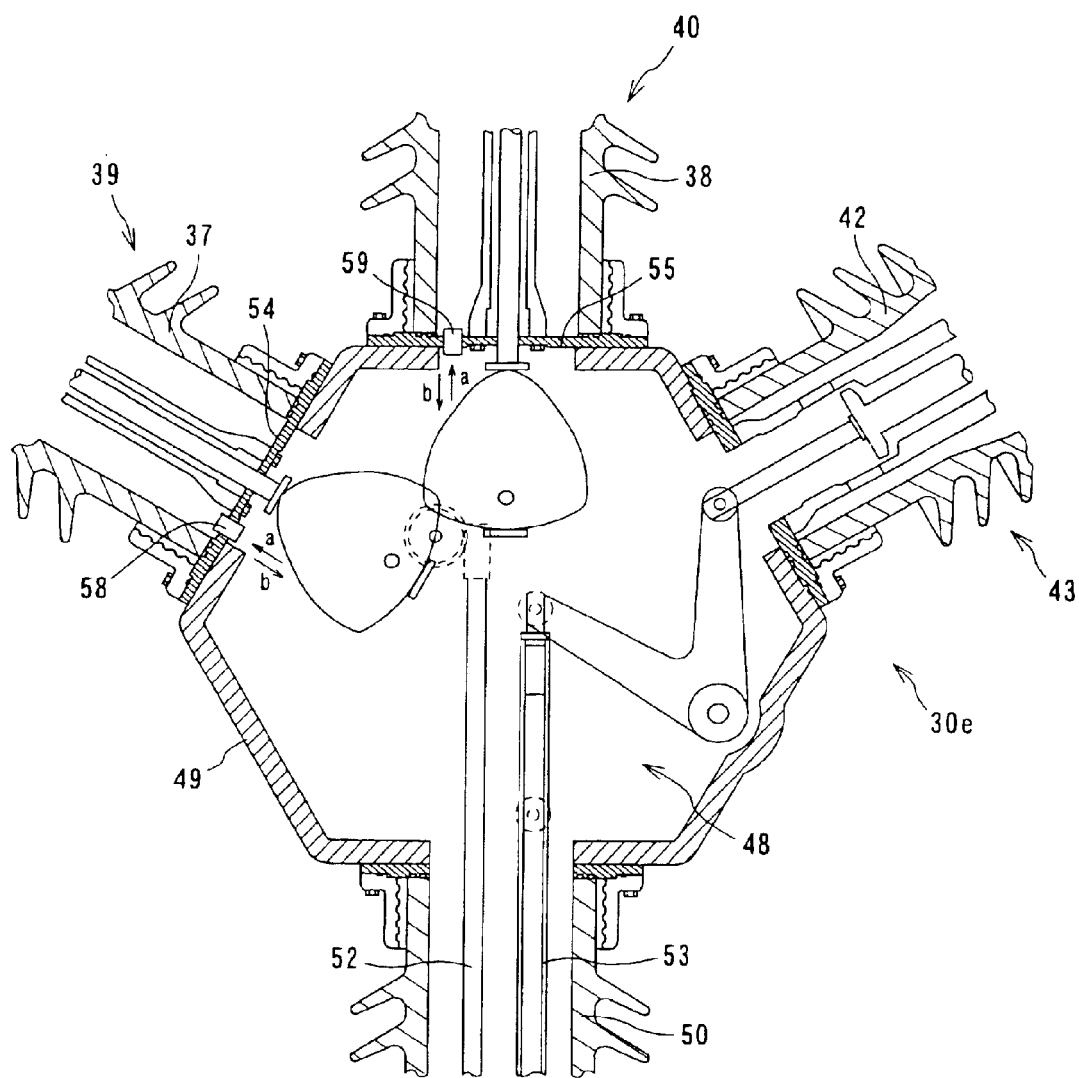
FIG. 6 is a detailed cross sectional view illustrating an integrated type gas-insulated switching apparatus according to a sixth embodiment of the present invention.
Figure 7:
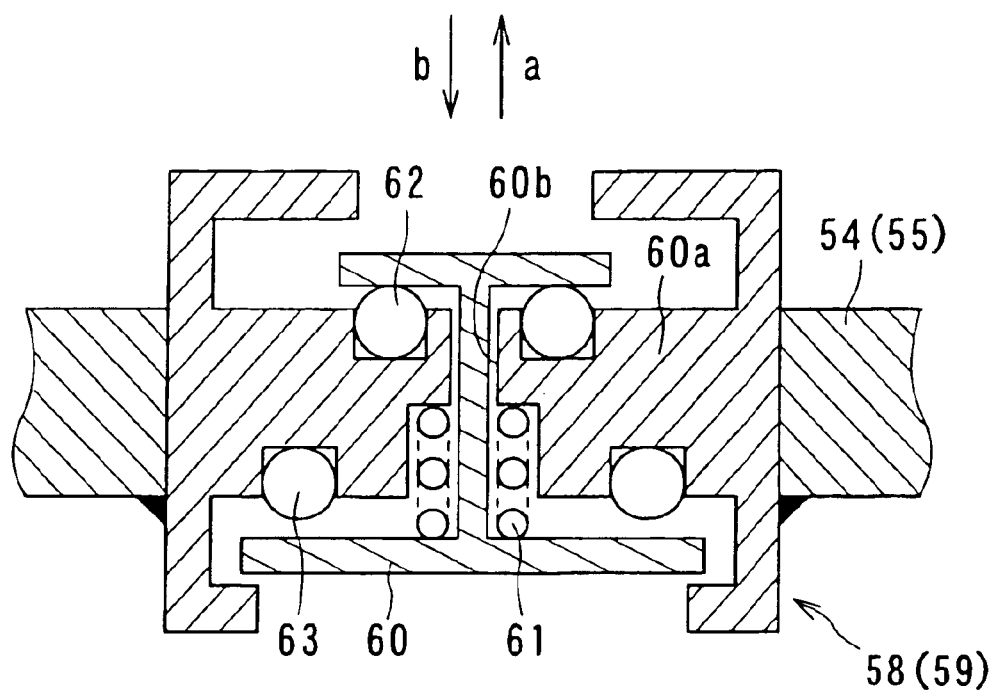
FIG. 7 is a cross sectional view of main elements of a check valve shown in FIG. 6.
Figure 8:
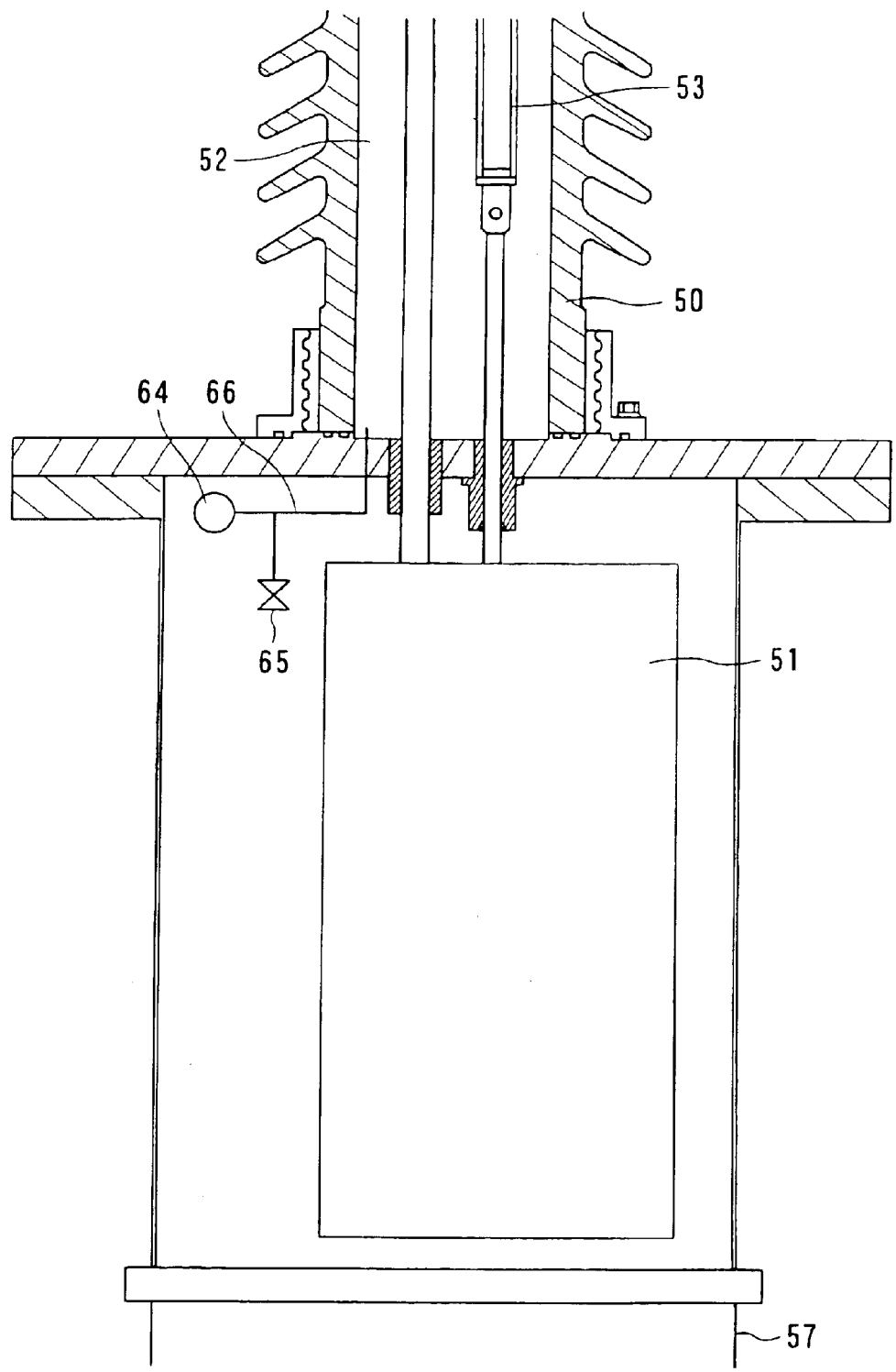
FIG. 8 is an enlarged cross sectional view illustrating a connection portion of an insulated container and a base portion according to the sixth embodiment.

Sixth Embodiment (FIGS. 6 to 8)

FIG. 6 is a detail cross sectional view illustrating an integrated type gas-insulated switching apparatus 30e according to a sixth embodiment, with the metal container 49 portion shown in FIG. 1 enlarged as an example. FIG. 7 is an enlarged cross sectional view of main elements of a check valve shown in FIG. 6. FIG. 8 is an enlarged cross sectional view of the main components of the control rods and the control unit.

As shown in FIG. 6, the insulated container 37, which houses the contact of one disconnecting switch 39, is connected to the metal container 49, which serves as a current path, and the drive mechanism 48 is also housed in the metal container 49. The partition wall 54 that forms a gas compartment is provided to the connection portion of the metal container 49 and the insulated container 37. Similarly, the insulator container 38, which houses the contact of the other disconnecting switch 40, is connected to the metal container 49 via the partition wall 55 that forms a gas compartment.

Check valves 58 and 59 are provided to these partition walls 54 and 55, respectively, and the structure is such that the insulating gas charged in the metal container 49 can move in the forward direction of the insulated containers 37 and 38 (direction of arrow a) from the metal container 49, but cannot move in the opposite direction (direction of arrow b).

The insulated container 42, which houses the contact of the circuit breaker 43, is connected to the metal container 49, and the insulated container 50, which houses the control rods 52 and 53 are also connected to the metal container 49. There is, however, no partition wall to connection between these and the metal container 49, so that no gas compartment is formed between the metal container 49 and the insulated container 50.

FIG. 7 is an example of the structure of the check valves 58 and 59 shown in FIG. 6. As shown in FIG. 7, a metal case 60a having a through-hole 60b is fixed by welding or the like in an airtight state to the partition walls 54 and 55 forming gas compartments. A movable valve 60 having an H-shaped cross section, for example, is mounted on this metal case 60a. This movable valve 60 is disposed in the through-hole 60b with opposing sections on both sides of the metal case 60a, and is biased outward from the metal container side (forward direction a) by a spring 61 such as a compressed coil spring or the like. O-rings 62 and 63 are disposed on either side of the metal case 60a, and form an airtight seal when contacting with the opposing faces of the movable valve 60. The pressure from the spring 61 ordinarily keeps the movable valve 60 away from the O-ring 63 located on the spring side.

With the check valve 58 structured as above, in its ordinary state, the movable valve 60 is in contact with the O-ring 62 due to the biasing force of the spring 61, so that the insulating gas does not flow from top to bottom (reverse direction b) in FIG. 7. On the other hand, the insulating gas can flow from bottom to top in FIG. 7 (forward direction a). However, in cases where the gas pressure differential between the bottom and top increases, and when a large amount of the insulating gas begins to flow from bottom to top in FIG. 7, the movable valve 60 is pushed by the gas flow against the spring 61 until it comes into contact with the O-ring 62. At this point the gas flow also comes to a stop in the forward direction a.

As shown in FIG. 7, the check valves 58 and 59 are designed such that the forward direction is the direction going from the metal container 49 toward the insulated containers 37 and 38, so that the insulated gas does not flow and insulating gas charged in each of the insulated containers 37 and 38 is instead sealed within each of the insulated containers 37 and 38 when the gas pressure of the insulator containers 37 and 38 is higher than the gas pressure inside the metal container 49. The insulated gas inside the metal container 49 begins to flow, however, when the gas pressure of the metal container 49 becomes higher than the gas pressure of the insulator containers 37 and 38, and the insulating gas inside the metal container 49 moves into the insulator containers 37 and 38. If the gas pressure inside the metal container 49 rises suddenly, though, the check valves 58 and 59 also shut off the gas flow in the forward direction, whereby the gas flow does not occur.

FIG. 8 illustrates the connection portion of the bottom ground potential of the insulated container 50 to the base portion 57.

The insulated container 50 and the control unit 51 are sealed airtight at the flange portion of the base portion 57 in this embodiment. A gas pressure monitoring device 64 is provided in the space on the control unit 51 side of the flange portion in the base portion 57, and a gas pipe 66 having a gas valve 65 is penetrated through the flange portion.

As a result, the gas pressure on the insulated container 50 side is monitored in the space on the control mechanism 51 side in the base portion 57, and the gas pressure can be adjusted by operating the gas valve 65 according to the monitored gas pressure.

With this embodiment, the gas compartment on the downstream side of the check valves 58 and 59, that is, the gas compartment housing the disconnecting contacts, is filled with the insulating gas slightly higher in pressure than atmospheric pressure while transporting the disassembled gas compartments to the site. The other gas compartment on the upstream side, that is, the gas compartment that houses the breaker contact and one end of which is at the ground potential, is transported to the site in an atmospheric state. After assembling the gas compartments at the site, just the upstream gas compartment transported in an atmospheric state is evacuated and filled with the insulating gas, so that the only other gas compartment on the downstream side that houses the disconnecting switch contacts is automatically filled with high-pressure gas. This eliminates the need for numerous gas compartments to be gas treated in parallel, and allows on-site assembly work of the switching apparatus to be carried out more efficiently.

In addition, the switching apparatus of this embodiment is provided with the check valves 58 and 59 for shutting off the gas flow in the forward direction a.

That is, whenever there is a large gas pressure differential between the gas compartments of the upstream side and downstream side, and a large quantity of gas flows in the forward direction a, even if an accidental arc occurs on the upstream side in the forward direction a of the check valves 58 and 59, and the gas pressure in this gas compartment becomes high enough that a large quantity of the gas begins to flow in the forward direction a of the check valves 58 and 59, the check valves 58 and 59 can shut off the large quantity of the gas. The function of shutting off the gas flow prevents various substances harmful to insulation and produced by this arc from being carried by the gas into the other gas compartment of the downstream side.

Even if, therefore, an accidental arc occurs on the upstream side of the gas flow, harmful gas does not flow into the downstream side, and the downstream gas compartment keeps sound.

Because the forward direction a of the gas flow is the direction going from the gas compartment that is at the ground potential at one end toward the gas compartment that does not have ground potential, during on-site assembly, it is possible to treat the gas at a physically low location, whereby to improve the work efficiency during on-site assembly and gas treatment.

Furthermore, in cases where the forward direction a of the gas flow is the direction going from the gas compartment that is at the ground potential at one end toward the gas compartment that does not have ground potential, and in cases where a gas pressure monitoring device is disposed in the gas compartment that is at the ground potential at one end, then the gas pressure under ground potential can be monitored, and gas pressure can also be monitored in the gas compartment located on the high potential side, making it possible to provide a switching apparatus that is inexpensive yet highly reliable.

Figure 9:
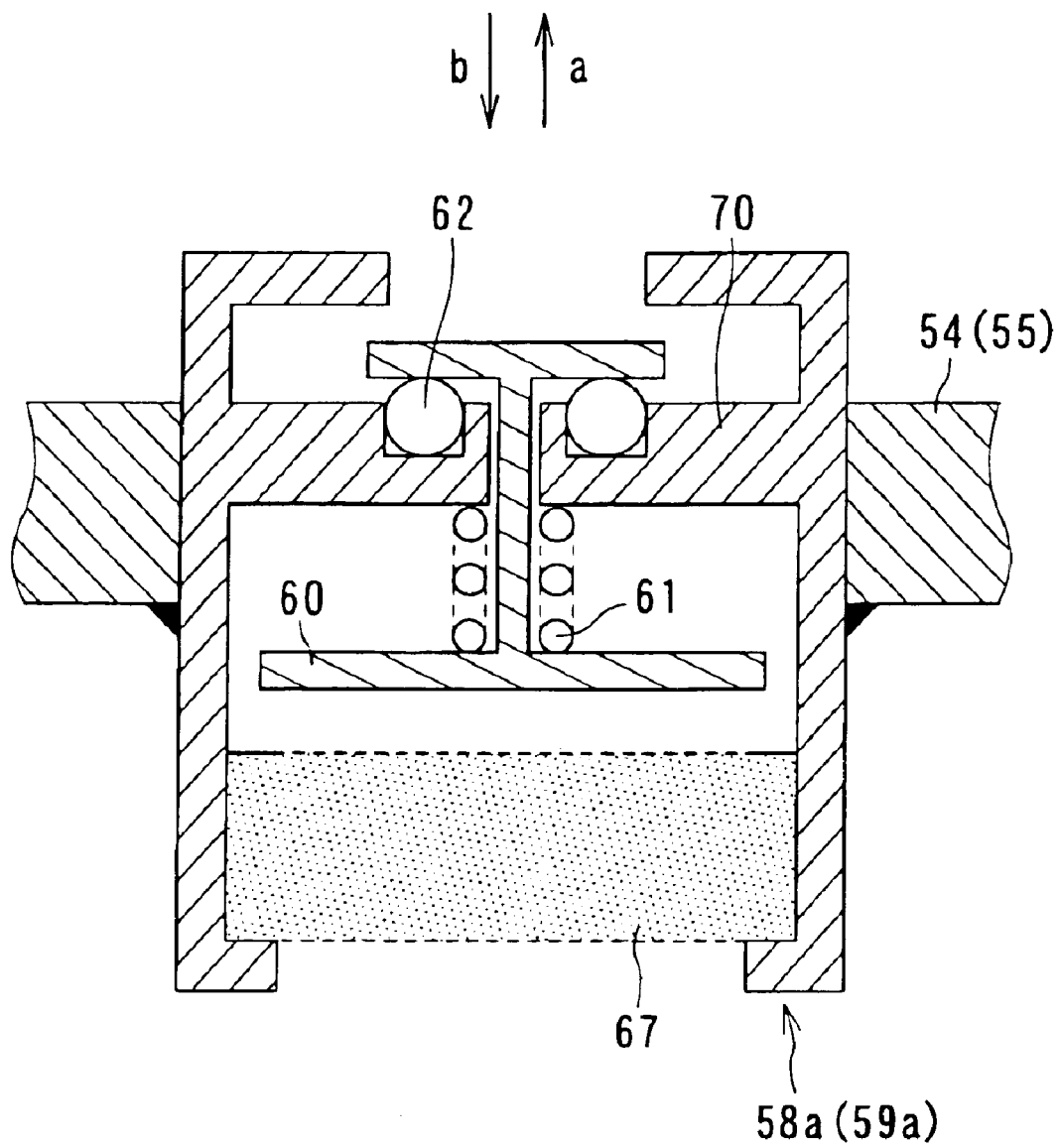
FIG. 9 is a cross sectional view illustrating another examples of check valves in a seventh embodiment of the present invention.

Seventh Embodiment (FIG. 9)

FIG. 9 is a cross sectional view illustrating another example of check valves 58a and 59a in a seventh embodiment of the present invention.

As shown in FIG. 9, the check valve 58a (59a) comprises a metal case 70 fixed with an airtight seal to the partition wall 54, 55 that form a gas compartment. The movable valve 60 is housed along with the spring 61 in the metal case 70. The spring 61 presses lightly against the O-ring 62. The metal case 70 houses a filter 67 that contains a synthetic zeolite or the like.

With this structure, in a normal state the check valves 58a, 59a are configured so that the movable valve 60 is put in contact with the O-ring 62 by the biasing force of the spring 61. The insulating gas is therefore unable to flow in the reverse direction b, which is from top to bottom in FIG. 9.

On the other hand, the insulating gas is able to flow in the forward direction a, which is from bottom to top in FIG. 9. At this point, however, the gas flow always passes through the filter 67, so that any gas moving downstream side contains no substances that are harmful to the gas insulation.

According to this embodiment, even if an accidental arc occurs on the upstream side in the forward direction a of the check valves 58a, 59a and the gas pressure in this gas compartment becomes high enough that gas flows from upstream gas compartment to another downstream gas compartment, the insulating gas flowing downstream side does not contain any substances produced by this arc that are harmful to the gas insulation. The downstream gas compartment, therefore, can continue to operate properly even if an accidental arc occurs the upstream gas compartment.

Figure 10:
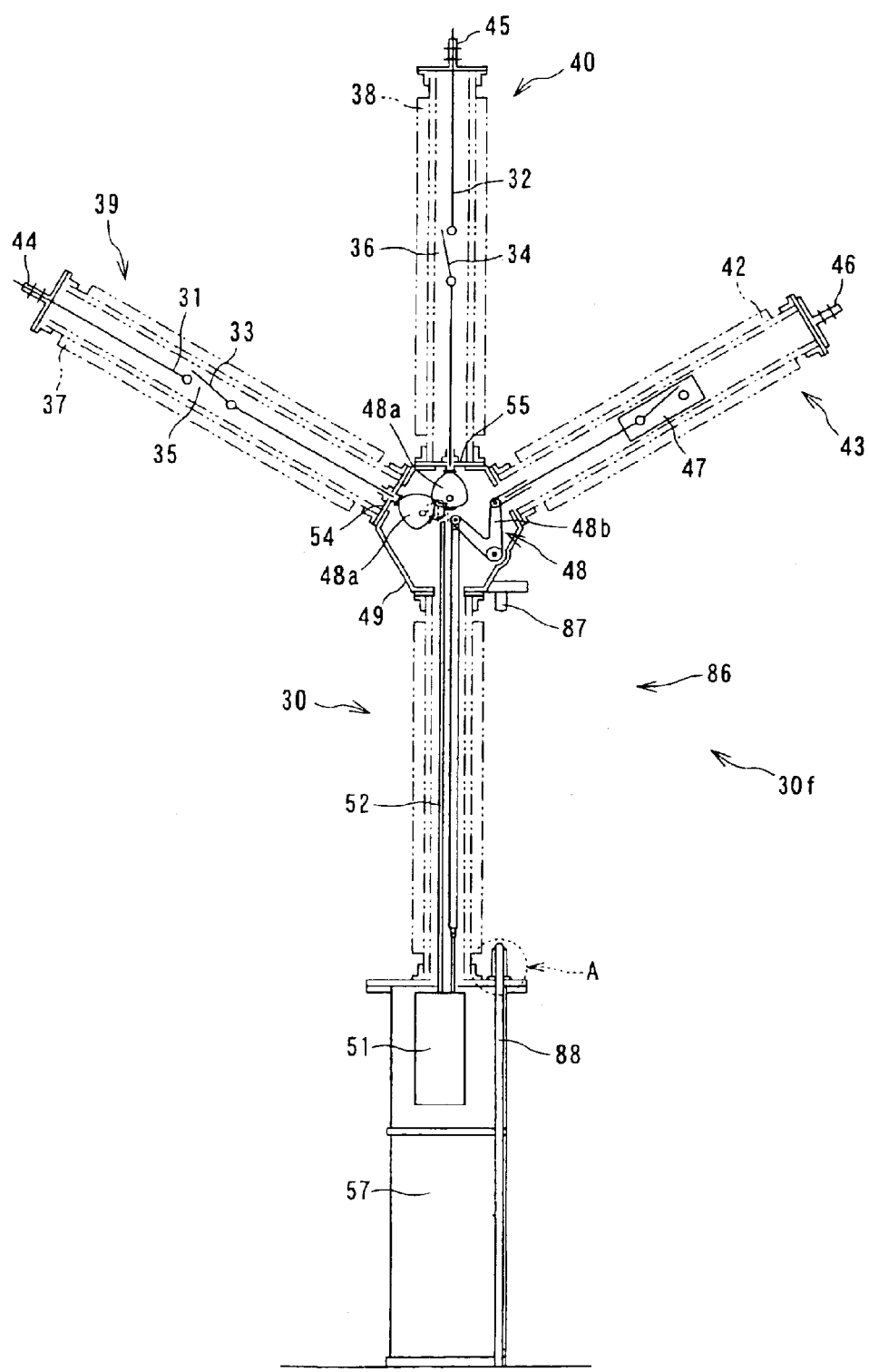
FIG. 10 is a cross sectional view illustrating an integrated type gas-insulated switching apparatus according to an eighth embodiment of the present invention.
Figure 11:
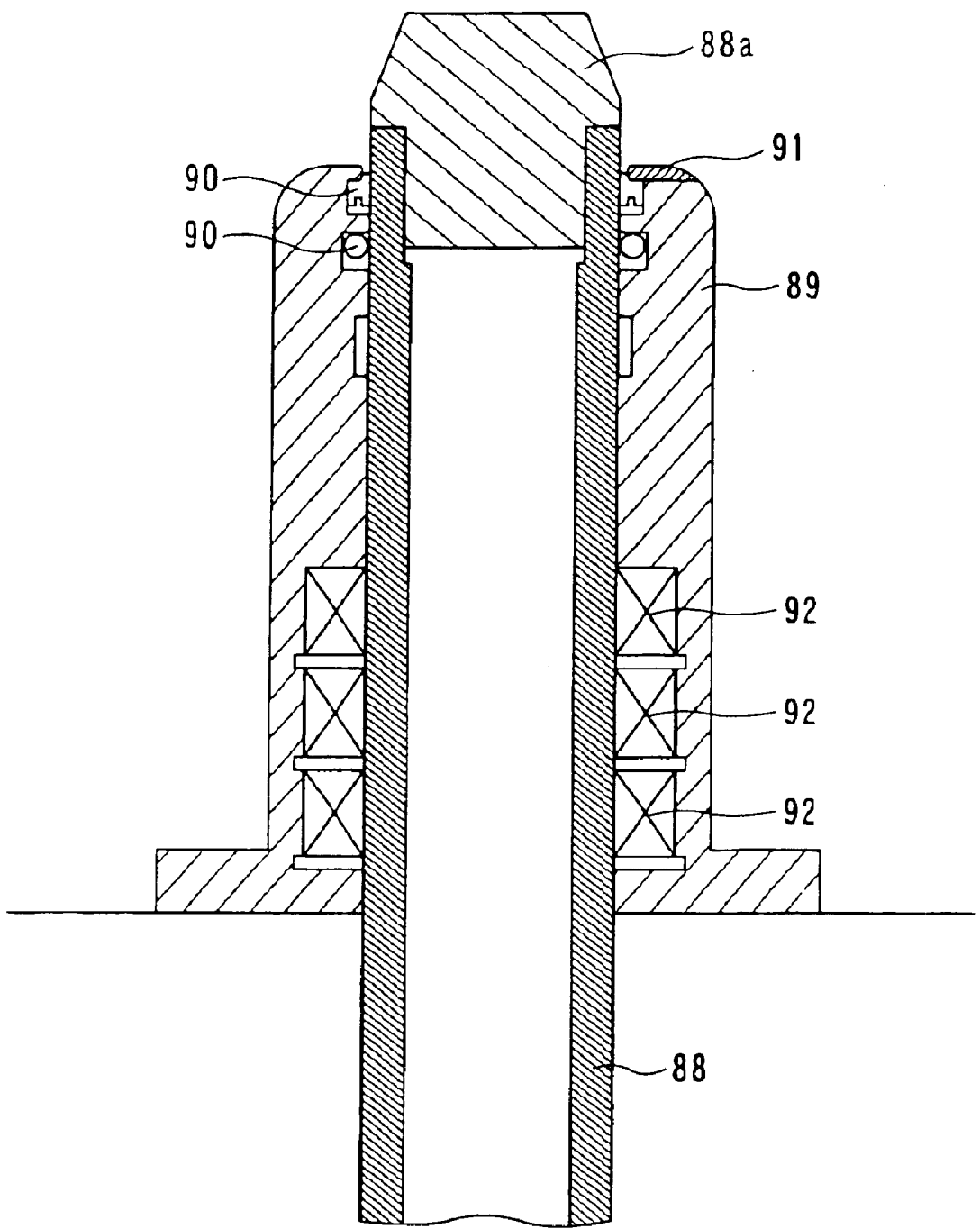
FIG. 11 is an enlarged view showing a portion of FIG. 10 bounded by a circle A.

Eighth Embodiment (FIGS. 10 and 11)

FIG. 10 is a cross sectional view illustrating a substantially entire integrated type gas-insulated switching apparatus 30f according to an eighth embodiment of the present invention. FIG. 11 is an enlarged view showing a portion of FIG. 10 bounded by a circle A.

Incidentally, elements of the switching apparatus 30f in FIG. 10 that are substantially the same as those of the switching apparatus 30 are given the same or similar reference numerals in FIG. 1, so that descriptions of the elements are simplified or omitted.

As shown in FIG. 10, the integrated type gas-insulated switching system 30f of the eighth embodiment comprises, in place of the grounding device 56, a grounding device 86 including a stationary electrode 87 and a movable electrode 88 and arranged to the outside of the insulated container 50.

The stationary electrode 87 is fixed to the outer periphery of the metal container 49 so as to be electrically connected thereto.

The movable electrode 88, as shown in FIG. 11, is slidably supported to a container case 89 fixed to the bottom portion of the insulated container 50 and connected to the base portion 57. The movable electrode 88 is arranged in opposite to the stationary electrode 87.

The movable electrode 88 having a lengthy tubular shape is penetrated through the upper surface of the base portion 57 so that the movable electrode 88 can be contained in the base portion 57.

That is, the movable electrode 88 can be slid at the height at which the movable electrode 88 can contact to the stationary electrode 87.

Packing members 90a and 90b are inserted at upper end side of the container case 89 between the outer periphery of the movable electrode 88 and the inner periphery of the container case 89. The packing members 90a and 90b are adapted to keep in watertight therebetween.

Upper side surface of the container case 89 is formed with a notch portion 91 for draining water dropping toward the notch portion 91. Sliding electrodes 92a, 92b, 92c are contained in the container case 89 so as to surround the movable electrode 88. The sliding electrodes 92a, 92b, 92c energize the movable electrode 88.

The overall operation of the switching apparatus 30f without the same operations described in the first embodiment ill now be described hereinafter When checking the switching apparatus 30f or other similar operations, the movable electrode 88 is slid at the height at which the movable electrode 88 contacts to the stationary electrode 87, thereby grounding the metal container 49.

When the metal container 49 is grounded by the grounding device 86, the metal container 49 supporting the disconnecting switches 39, 40 and the circuit breaker 43 can be directly grounded by the grounding device 86. Even if an overcurrent flows through the movable electrode 88 when grounding the metal container 49, the sliding direction of the movable electrode 88 is orthogonal to a direction in which electro-magnetic force acts on the movable electrode 88, and the movable electrode 88 is supported to the strong container, so that it is possible to prevent the movable electrode 88 from being separated due to the electromagnetic force, and from making displacement.

When the grounding device 86 has an opening state so that the movable electrode 88 is separated from the stationary electrode 87, the movable electrode 88 is contained in the base portion 57, causing the movable electrode 88 to be unaffected by weather conditions such as rainy weather or the like. When the grounding device 86 has the opening state, an upper end portion 88a of the movable electrode 88 that is penetrated through the container case 89 is subjected to atmosphere. However, even if the upper end portion 88a of the movable electrode 88 is exposed to the rain, the packing member 90a and 90b prevents the rainwater from being entered into the container case 89, so that it is possible to prevent the whole movable electrode from being wet with the rain. In addition, because the notch portion 91 activates the drainage of the rainwater, it is possible to prevent the rainwater from being trapped in the upper end portion 88a of the movable electrode 88.

In addition, because the grounding device 56 grounds the metal container 49, it is possible to safely replace the switching apparatus. In particular, even if an overcurrent flows through the movable electrode 88 when grounding the metal container 49, it is possible to prevent the movable electrode 88 from being separated due to the electro-magnetic force, and from making displacement, thereby grounding the metal container 49 with high reliability and improving the safety of replacing work.

In addition, because the grounding device 86 is arranged to the outside of the insulated container 50, workers directly ascertain with their eyes the state of the grounding device 86, so that it is possible to prevent the workers from carelessly performing the checking operation or the replacement operation of the broken switching apparatus while the metal container 49 is not grounded.

When the grounding device 86 has an opening state, the movable electrode 88 is unaffected by weather conditions such as rainy weather or the like, so that it is possible to prevent the movable electrode 88 from rusting, and prevent trashes from being adhered on the movable electrode 88, thereby improving the reliability of the switching apparatus.

Figure 12:
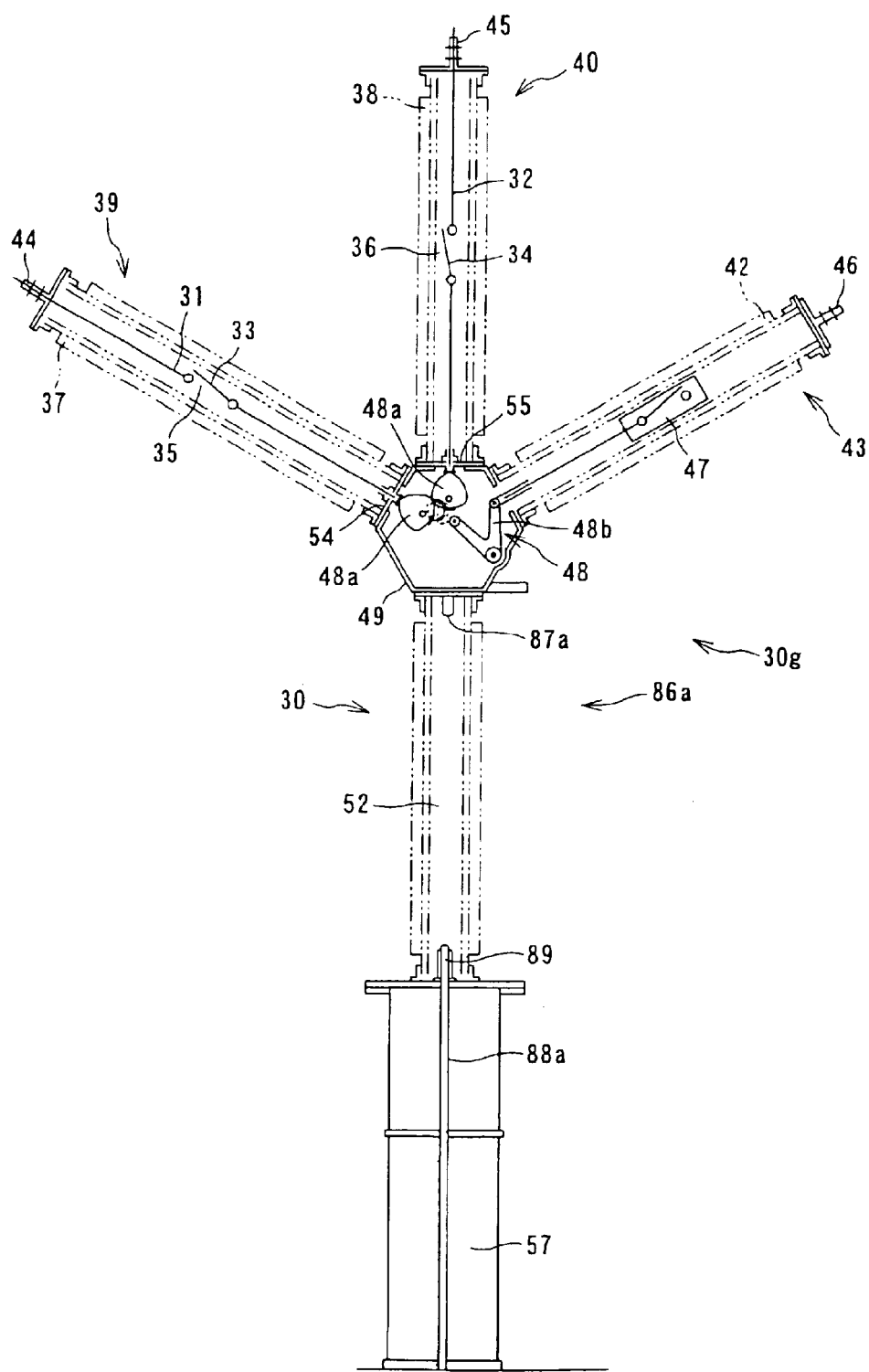
FIG. 12 is a cross sectional view illustrating an integrated type gas-insulated switching apparatus according to a ninth embodiment of the present invention.

Ninth Embodiment (FIG. 12)

FIG. 12 is a cross sectional view illustrating a substantially entire integrated type gas-insulated switching apparatus 30g according to a ninth embodiment of the present invention.

Incidentally, elements of the switching apparatus 30g in FIG. 12 that are substantially the same as those of the switching apparatuses 30 and 30f are given the same or similar reference numerals in FIGS. 1 and 10, so that descriptions of the elements are simplified or omitted.

As shown in FIG. 12, the integrated type gas-insulated switching system 30g of the ninth embodiment comprises a grounding device 86a including a stationary electrode 87a and a movable electrode 88a and arranged to the inside of the insulated container 50.

The stationary electrode 87a is fixed to the bottom surface of the metal container 49 in the insulated container 50 so as to be electrically connected thereto.

The movable electrode 88a is slidably supported to the container case 89 fixed to the inside of the insulated container 50 and connected to the base portion 57. The movable electrode 88a is arranged in opposite to the stationary electrode 87a.

Packing members (not shown) are inserted at upper end side of the container case 89 between the outer periphery of the movable electrode 88a and the inner periphery of the container case 89a, and adapted to keep in watertight therebetween. In this embodiment, no notch portion is formed on the upper side surface of the container case 89.

According to this embodiment, because the stationary electrode 87a and movable electrode 88a of the grounding device 86a are contained in the insulated container 50 which is filled with the insulating gas, the stationary electrode 87a and movable electrode 88a are unaffected by the whether conditions of the atmosphere. It is possible, therefore, to improve the reliability of the grounding device 86a, and further improve the safety of checking work and that of replacing work.

The metal container 49 is grounded by the grounding device 86a having always best state without being subjected to the atmosphere, omitting the work of ascertaining the state of the grounding device 86a. Gap between the electrodes 87a and 88a is positioned in the inner space of the insulated container 50 which is filled with the insulating gas, making short the length of the gap therebetween required for the opening operation of the device 86a, as compared with the gap positioned in the atmosphere, thereby making reduced the time required for grounding the metal container 49.

Figure 13:
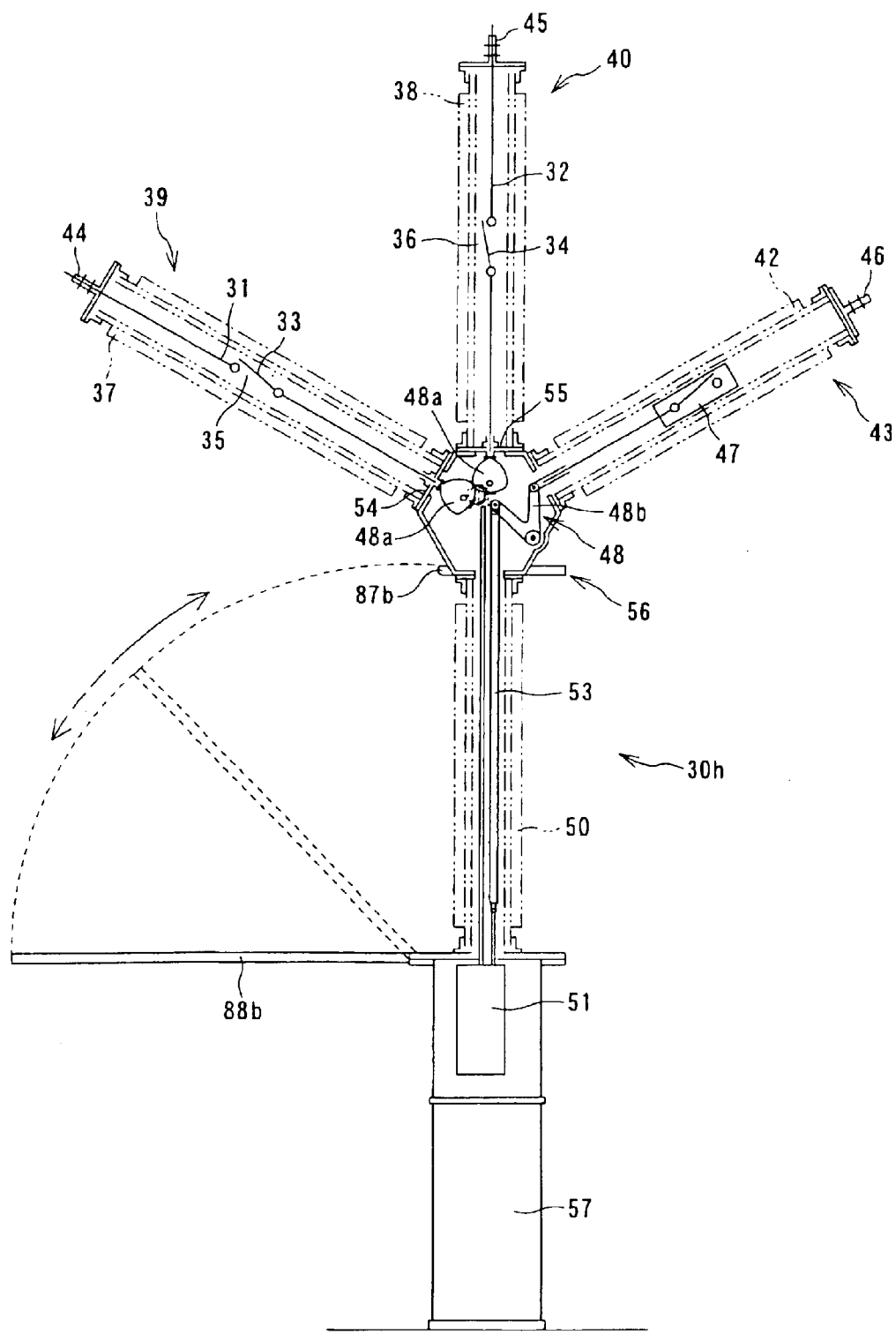
FIG. 13 is a cross sectional view illustrating an integrated type gas-insulated switching apparatus according to a tenth embodiment of the present invention.

Tenth Embodiment (FIG. 13)

FIG. 13 is a cross sectional view illustrating a substantially entire integrated type gas-insulated switching apparatus 30h according to a tenth embodiment of the present invention.

Incidentally, elements of the switching apparatus 30h in FIG. 13 that are substantially the same as those of the switching apparatuses 30 and 30f are given the same or similar reference numerals in FIGS. 1 and 10, so that descriptions of the elements are simplified or omitted.

As shown in FIG. 13, the integrated type gas-insulated switching system 30h of the tenth embodiment comprises a grounding device 86b including a stationary electrode 87b and a movable electrode 88b and arranged to the outside of the insulated container 50.

The stationary electrode 87b is fixed to the outer periphery of the metal container 49 so as to be electrically connected thereto.

The movable electrode 88a, as shown in FIG. 13, is rotatably supported at its one end portion to the base portion 57 and connected thereto. The movable electrode 88b can be rotated about its one end portion so that other end portion of the movable electrode 88b can contact to the stationary electrode 87b.

According to this embodiment, when the grounding device 86b has an opening state, the movable electrode 88b is positioned at a predetermined angle with respect to the vertical direction of the insulated container 50 so as to be separated from the stationary electrode 87b.

When grounding the metal container 49 by the grounding device 86b, the movable electrode 88b is rotated its one end portion till the angle such that the other end portion of the movable electrode 88b contacts to the stationary electrode 87b. This configuration of the grounding device 86b is simplified and makes useless the elements for sliding the movable electrode, thereby providing the grounding device 86b with low-cost.

Because the elements for sliding the movable electrode while the energized state of the movable electrode is kept, are eliminated, it is possible to prevent the movable electrode from being contaminated via sliding portions or their gaps, and prevent rainwater from being entered into the movable electrode.

In addition, because workers easily ascertain with their eyes the state of the grounding device 86b, it is possible to improve the safety of checking work and that of replacing work, and to make short the time required for grounding the metal container 49.

Figure 14:
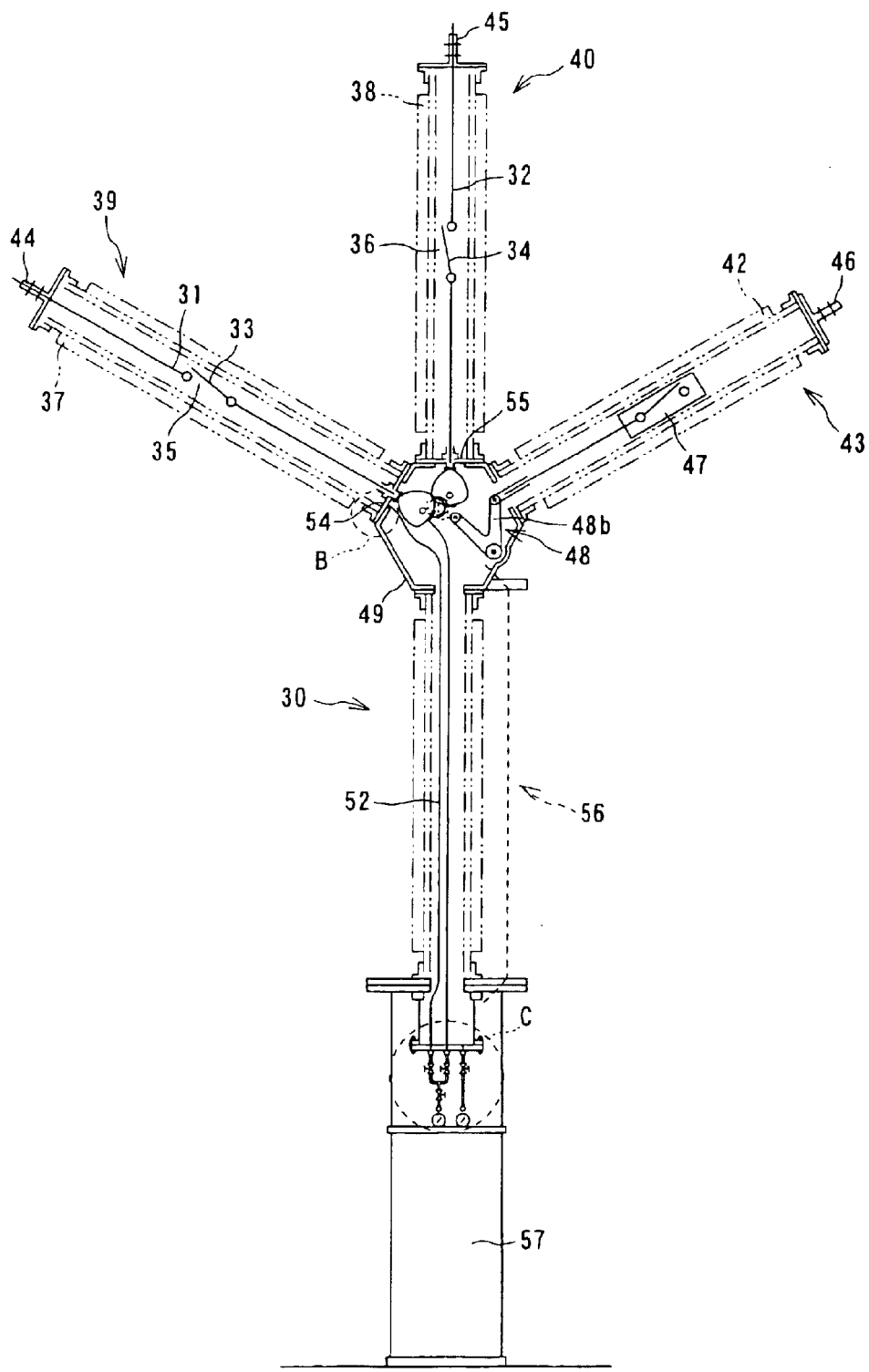
FIG. 14 is a cross sectional view illustrating an integrated type gas-insulated switching apparatus according to an eleventh embodiment of the present invention.
Figure 15:
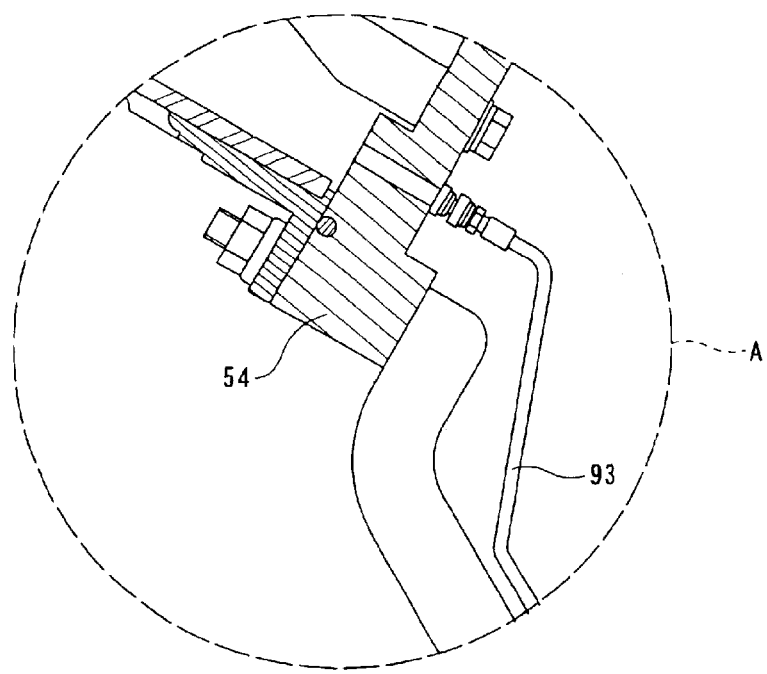
FIG. 15 is an enlarged view showing a portion of FIG. 14 bounded by a circle B.
Figure 16:
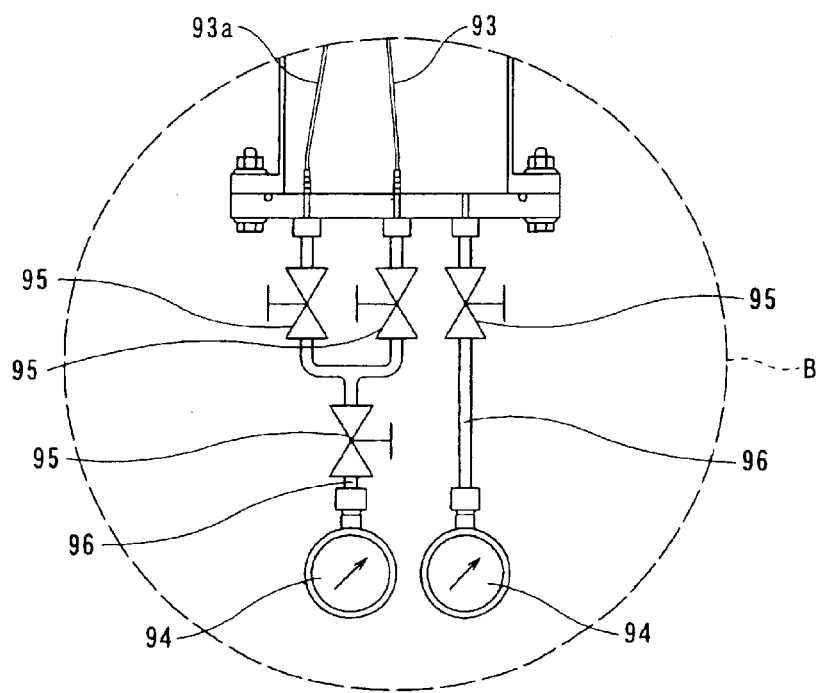
FIG. 16 is an enlarged view showing a portion of FIG. 10 bounded by a circle C.

Eleventh Embodiment (FIGS. 14 to 16)

FIG. 14 is a cross sectional view illustrating a substantially entire integrated type gas-insulated switching apparatus 30i according to an eleventh embodiment of the present invention. FIG. 15 is an enlarged view showing a portion of FIG. 14 bounded by a circle B, and FIG. 16 is an enlarged view showing a portion of FIG. 10 bounded by a circle C.

Incidentally, elements of the switching apparatus 30i in FIG. 14 that are substantially the same as those of the switching apparatus 30 are given the same or similar reference numerals in FIG. 1, so that descriptions of the elements are simplified or omitted.

As shown in FIGS. 14 and 15, the integrated type gas-insulated switching system 30i of the eleventh embodiment comprises insulated pipes 93a and 93b made of an insulating material, such as polytetrafluoroethylene material, nylon material or the like. Each of one end portions of each of the insulated pipes 93a and 93b is connected to each of the partition walls 54 and 55 so that the gas compartments in the insulated containers 37 and 38 are communicated with the gas compartments in the insulated pipes 93a and 93b.

The insulated pipes 93a and 93b, as shown in FIGS. 14 and 16, run through the insulated container 50 so that other end portions of the insulated pipes 93a and 93b are guided into the inside of the base portion 57 supporting the insulated container 50. The other end portions of the insulated pipes 93a and 93b are connected to a gas density monitoring device 94a via gas valves 95a and 95b. On the other hand, the inside of the insulated container 50 is connected to a gas density monitoring device 94b via a gas valve 95c and a gas tube 96b.

According to this embodiment, because the insulated pipes 93a and 93b are made of an insulating material, the insulated pipes 93a and 93b can be laid without incident in the space filling with the insulating gas. That is, the insulated pipes 93a and 93b can be laid from the partition walls 54, 55 forming the gas compartments with high potentials to the inner space of the base portion 57 with a ground potential.

As a result, the gas density monitoring device 64a can monitor, at the inner space with the ground potential, the gas pressures in the insulated pipes 93a and 93b. When performing gas treatment of the disconnecting switches 39, 40, the utilization of the gas valves 95a, 95b, 95d permits the gas treatment works at the position with the ground potential.

The gas pressure in the space communicated among the inner space of the insulated container 42 of the circuit breaker 43, that of the metal container 49 and that of the insulated container 50 can be monitored at the position with the ground potential by the gas density monitoring device 94b. The utilization of the gas valve 95c allows the gas treatment work. It is, therefore, possible to monitor each of the gas pressures of each of the gas compartments under the ground potential, making it possible to improve the reliability and the safety of the switching apparatus, and making the working cost reduced.

Incidentally, the present invention is not limited to the first embodiment to eleventh embodiment described above, and can be implemented in myriad aspects.

Figure 17:
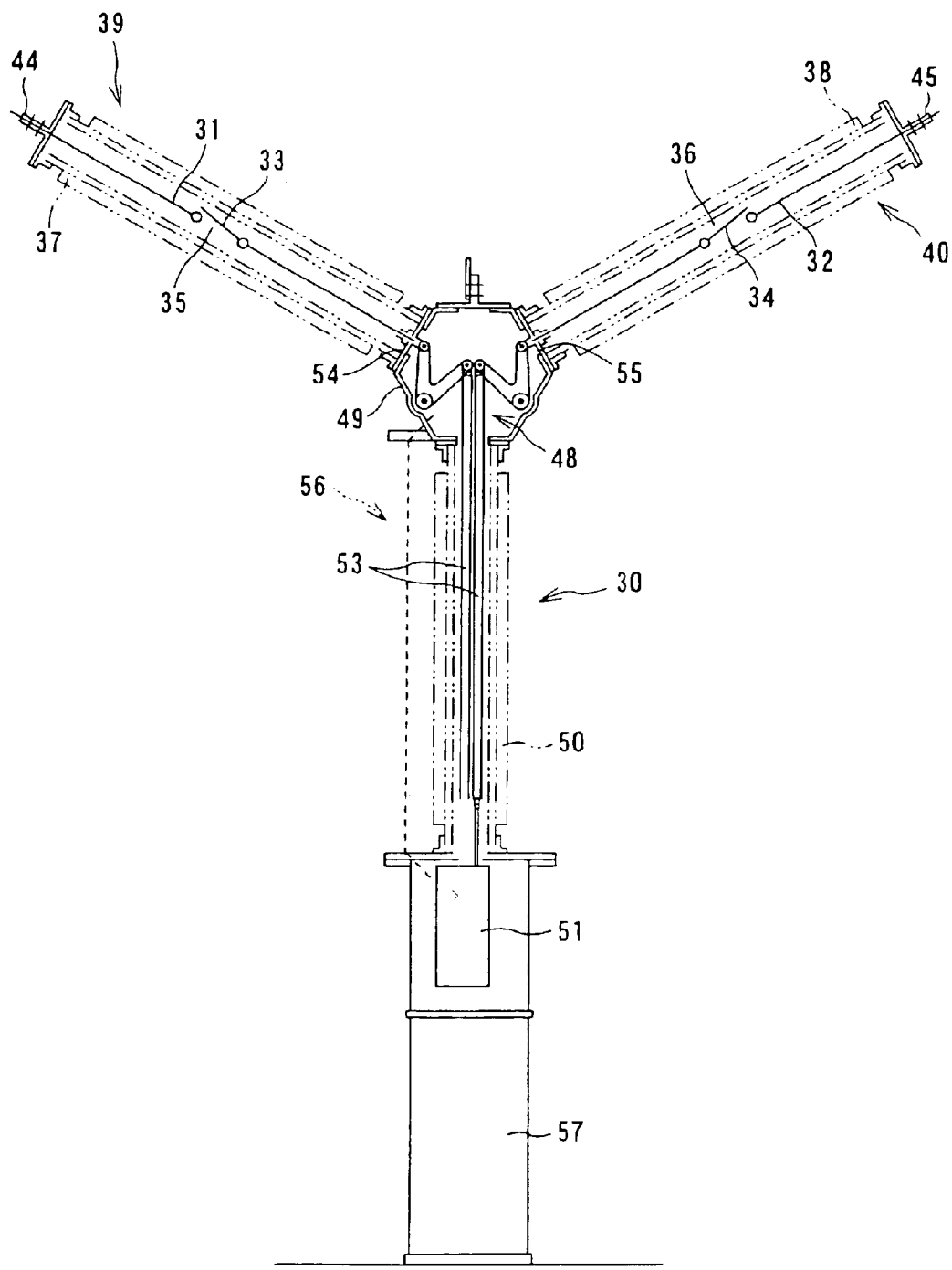
FIG. 17 is a cross sectional view illustrating a modification of an integrated type gas-insulated switching apparatus according to the present invention.
Figure 18:
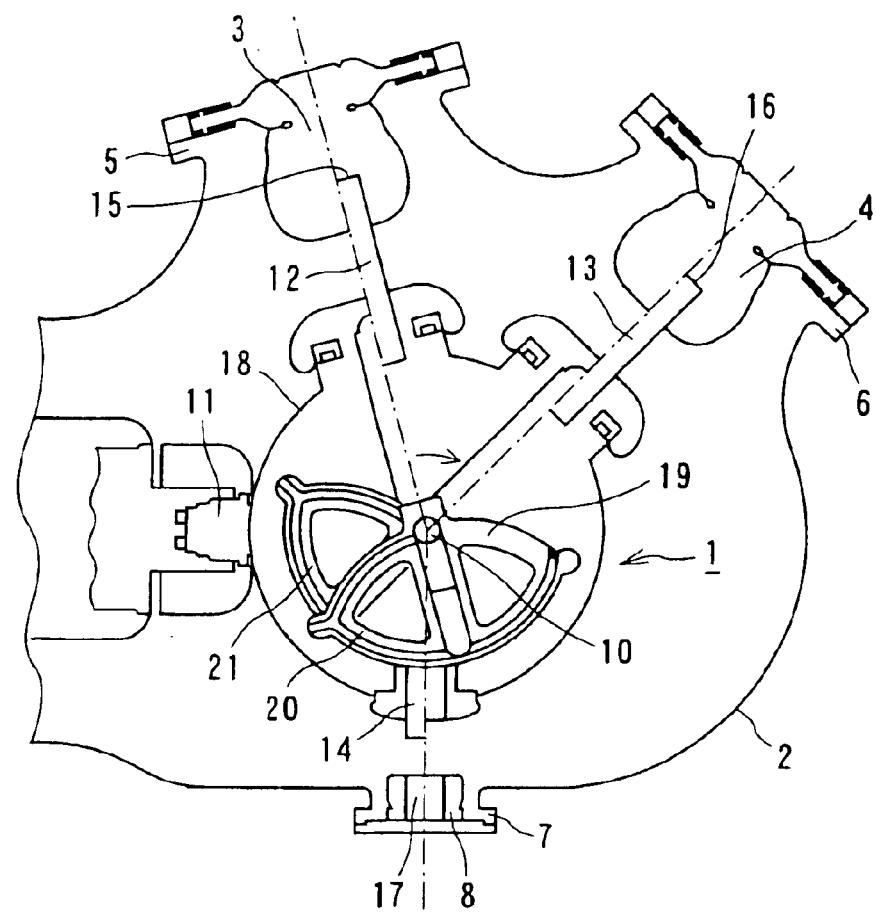
FIG. 18 is a front cross sectional view illustrating a vicinity of a disconnecting contact in a conventional integrated type gas-insulated switching apparatus.

For example, as shown in FIG. 17, in cases where the structure of the switching apparatus is the same as that in the fourth embodiment, but the position where the disconnecting switch 40 is attached is changed, the overall height can be reduced, which optimizes the balance of the switching apparatus.

In addition, the opening and closing performance required for the disconnecting switches 39 and 40 (for example, the opening and closing speed of the disconnecting contacts 35 and 36) can be satisfied by changing the configuration of the drive mechanism 48.

The modification shown in FIG. 17, therefore, allows the movable electrodes of the disconnecting contacts to be driven at higher speed, so that it is easier to shut off loop current. Because the loop current must be shut off when busbar switching is performed with two disconnecting contacts connected to the double-bus bars, this structure of the modification is effective in such situations.

In addition, the present invention is not limited to the configurations of the respective embodiments. For example, it is possible to suitably change types of the switching devices, numbers thereof, kinds of the used insulating gases, the qualities of materials of the containers, the shapes thereof and so on.

While there has been described what is at present considered to be the preferred embodiments and modifications of the present invention, it will be understood that various modifications which are not described yet may be made therein, and it is intended to cover in the appended claims all such modifications as fall within the true spirit and scope of the invention.

The entire contents of Japanese Patent Application 2000-341079 filed on Nov. 8, 2000, Japanese Patent Application 2000-340950 filed on Nov. 8, 2000 and Japanese Patent Application 2001-199062 filed on Jun. 29, 2001 are incorporated herein.

What is claimed is:

1. An integrated type gas-insulated switching apparatus 4 comprising:
   a plurality of switching devices each including a contact and an insulated container in which the contact is contained, said contact comprising electrodes adapted to be contacted with each other and separated therefrom, said insulated container being filled with an insulating gas;
   a conductive container to which the plurality of switching devices are connected, respectively;
   an insulated structure supporting the conductive container;
   a driving mechanism housed in the conductive container and operatively connected to at least one of the electrodes of each of the contacts, said driving mechanism being adapted to drive the at least one of the electrodes so as to make open the electrodes or to make close them; and
   an insulated control member housed in the insulated structure and the conductive container and linked to the driving mechanism, said insulated control member being adapted to control the drive of the driving mechanism;
   wherein said insulated structure is arranged vertically, and said insulated control member is adapted to move vertically in the conductive container so as to control the driving mechanism, further comprising a supporting member provided in at least one of the conductive container and the insulated structure and supporting the insulated control member so as to guide the vertical movement thereof.

2. An integrated type gas-insulated switching apparatus comprising:
   a plurality of switching devices each including a contact and an insulated container in which the contact is contained, said contact comprising electrodes adapted to be contacted with each other and separated therefrom, said insulated container being filled with an insulating gas;
   a conductive container to which the plurality of switching devices are connected, respectively;
   an insulated structure supporting the conductive container; and
   means for electrically changing the conductive container to a grounded state or a nongrounded state.

3. The integrated type gas-insulated switching apparatus according to claim 2, wherein at least one of said switching devices is a disconnecting switch.

4. The integrated type gas-insulated switching apparatus according to claim 2, wherein at least one of said switching devices is a circuit breaker.

5. The integrated type gas-insulated switching apparatus according to claim 2, wherein said changing means comprises a stationary electrode and a movable electrode adapted to be contacted with the stationary electrode and separated therefrom, said stationary electrode being fixed to the conductive container, said insulated structure being supported by a base portion, said movable electrode being slidably conductively provided for the base portion.

6. The integrated type gas-insulated switching apparatus according to claim 5, wherein said movable electrode is arranged to an outside of the insulated structure.

7. The integrated type gas-insulated switching apparatus according to claim 5, wherein, when the conductive container is changed to the nongrounded state, a part of said movable electrode is permitted to be contained in the base portion.

8. The integrated type gas-insulated switching apparatus according to claim 5, wherein said changing means comprises a slide portion for supporting the movable electrode to be slidable, a sealing member provided between the sliding member and the movable electrode and adapted to keep watertight therebetween and a drainage member mounted on an upper side of the slide portion and adapted to drain water.

9. The integrated type gas-insulated switching apparatus according to claim 5, wherein said movable electrode and stationary electrode are provided inside of the insulated structure.

10. The integrated type gas-insulated switching apparatus according to claim 2, wherein said changing means comprises a stationary electrode and a movable electrode adapted to be contacted with the stationary electrode and separated therefrom, said stationary electrode being fixed to the conductive container, said insulated structure being supported by a base portion, said movable electrode having one end rotatably conductively supported to the base portion.

11. An integrated type gas-insulated switching apparatus comprising:
    a plurality of switching devices each including a contact and an insulated container in which the contact is contained, said contact comprising electrodes adapted to be contacted with each other and separated therefrom, said insulated container being filled with an insulating gas;
    a conductive container being filled with an insulating gas, to which the plurality of switching devices are connected, respectively;
    an insulated structure supporting the conductive container;
    a partition wall provided between at least one of the switching devices and the conductive container so as to form a first gas compartment in the at least one of the switching devices and a second gas compartment in the conductive container; and
    means disposed to the partition wall and adapted to cause the insulating gas to flow in a forward direction from one of the first and second gas compartments toward other thereof and not to flow in opposite direction to the forward direction.

12. The integrated type gas-insulated switching apparatus according to claim 11, further comprising means for shutting off the insulating gas flow in the forward direction when the gas pressure differential between the first and second gas compartments increases so that the amount of gas flowing in the forward direction becomes large.

13. The integrated type gas-insulated switching apparatus according to claim 11, further comprising filter means provided along a path of the insulating gas flowing in the forward direction and adapted to filter gases and particles in the insulating gas, said gases being different from the used insulating gas.

14. The integrated type gas-insulated switching apparatus according to claim 11, wherein the forward direction of the gas flow is a direction directed from one of the first and second gas compartments whose one end is the ground potential toward other thereof where there is no ground potential.

15. The integrated type gas-insulated switching apparatus according to claim 11, further comprising means for monitoring a gas pressure in one of the first and second compartments where one end is the ground potential.

16. An integrated type gas-insulated switching apparatus comprising:
   a plurality of switching devices each including a contact and an insulated container in which the contact is contained, said contact comprising electrodes adapted to be contacted with each other and separated therefrom, said insulated container being filled with an insulating gas;
   a conductive container to which the plurality of switching devices are connected, respectively;
   an insulated structure supporting the conductive container; and
   means for fanning in the insulated containers of the switching devices separated gas compartments, respectively;
   at least one of said gas compartments being a common gas compartment of the conductive container and the insulated structure.

17. The integrated type gas-insulated switching apparatus according to claim 16, further comprising an insulated pipe member and a gas density monitoring unit for monitoring a gas density in the insulated pipe member, one end of insulated pipe member being connected to the at least one of the separated gas compartments, other end of which running through an inside of the insulated structure so that the other end of the pipe member is guided inside of the base portion so as to be connected to the gas density monitoring unit.

18. An integrated gas-insulated switching apparatus comprising:
   two switching devices including one circuit breaker and one disconnecting switch, each of said circuit breaker and said disconnecting switch including a contact and an insulated container in which the contact is contained, said contact comprising electrodes adapted to be contacted with each other and separated from each other, said insulated container being filled with an insulating gas;
   a conductive container, formed of metal, to which the circuit breaker and the disconnecting switch are connected, respectively;
   an insulated structure supporting the conductive container;
   driving units housed in the conductive container and operatively connected to the electrodes of the contacts so as to drive the electrode; and
   insulated control rods for the circuit breaker and the disconnecting switch housed in the insulated structure and the conductive container and linked to the driving unit for connecting the driving units to an operating unit,
   said contact of the disconnecting switch being contained in the insulated container, which keeps gastight to form a gas compartment separated from the conductive container, and said insulated container of the circuit breaker forming a same gas compartment as that of the conductive container and that of the insulated structure.

19. The integrated type gas-insulated switching apparatus according to claim 18, wherein said circuit breaker has a terminal which is connected to a conductive container of another switching apparatus via a conductive member.

20. An integrated gas-insulated switching apparatus comprising:
   two disconnecting switches each including a contact and an insulated container in which the contact is contained, said contact comprising electrodes adapted to be contacted with each other and separated from each other, said insulated container being filled with an insulating gas;
   a conductive container, formed of metal, to which the two disconnecting switches are connected, respectively;
   an insulated structure supporting the conductive container;
   driving units housed in the conductive container and operatively connected to the electrodes of the contacts so as to drive the electrode; and
   at least one insulated control rod housed in the insulated structure and the conductive container and linked to the driving unit for connecting the driving unit to an operating unit.

21. The integrated type gas-insulated switching apparatus according to claim 20, wherein said insulated container of the disconnecting switch keeps gastight to form a gas compartment separated from the conductive container.

* * * * *